United States Patent
Wang et al.

(10) Patent No.: US 6,831,163 B2
(45) Date of Patent: Dec. 14, 2004

(54) BICHROMOPHORIC MOLECULES

(75) Inventors: Ruizheng Wang, Rochester, NY (US); Ann L. Carroll-Lee, Webster, NY (US); Kevin W. Williams, Rochester, NY (US); Linda A. Kaszczuk, Webster, NY (US); Charles H. Weidner, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 90 days.

(21) Appl. No.: 10/329,912

(22) Filed: Dec. 26, 2002

(65) Prior Publication Data

US 2004/0127360 A1 Jul. 1, 2004

(51) Int. Cl.[7] .......................... C09B 23/00; C09B 33/06
(52) U.S. Cl. ..................... 534/604; 534/614; 546/165; 546/256; 548/365.1; 558/392; 558/403
(58) Field of Search ............................... 534/604, 614; 546/165, 256; 548/365.1; 558/392, 403

(56) References Cited

U.S. PATENT DOCUMENTS

| | | | |
|---|---|---|---|
| 4,950,639 A | * 8/1990 | DeBoer et al. | 503/227 |
| 5,139,997 A | 8/1992 | Bach et al. | 503/227 |
| 5,223,476 A | 6/1993 | Kanto et al. | 503/227 |
| 5,281,572 A | 1/1994 | Bach et al. | 503/227 |
| 5,706,815 A | 1/1998 | Akada | 600/438 |
| 5,843,617 A | 12/1998 | Nairne et al | 430/201 |
| 5,972,838 A | 10/1999 | Pearce et al. | |
| 6,602,648 B2 | * 8/2003 | Nakamura | 430/270.1 |
| 6,623,908 B2 | * 9/2003 | Zheng et al. | 430/270.1 |
| 2002/0028404 A1 | * 3/2002 | Nakamura | 430/270.1 |

FOREIGN PATENT DOCUMENTS

| | | |
|---|---|---|
| EP | 0 499 822 | 1/1992 |
| EP | 0 675 003 A | 10/1995 |
| EP | 0 747 700 A | 12/1996 |

* cited by examiner

Primary Examiner—Fiona T. Powers
(74) Attorney, Agent, or Firm—Arthur E. Kluegel; Kathleen Neuner Manne

(57) ABSTRACT

Disclosed is a molecule containing a first chromophore that exhibits a first absorption maximum above 700 nm and a second chromophore that exhibits a second absorption maximum different from the first absorption maximum, wherein the absorption of the first and second chromophores are substantially independent of each other. The molecule exhibits improved stability.

31 Claims, No Drawings

BICHROMOPHORIC MOLECULES

CROSS-REFERENCE TO RELATED APPLICATIONS

This application is cofiled with commonly assigned application U.S. Ser. No. 10/329,911 which describes and claims thermal transfer elements containing the colorants described herein.

FIELD OF THE INVENTION

This invention relates to molecules having a first chromophore having a maximum absorption above 700 nm and an independent second chromophore having a different absorption maximum than the first chromophore.

BACKGROUND OF THE INVENTION

In recent years, there is a strong need in various high technology applications for compounds that absorb in the infrared regions of the electromagnetic spectrum. Such materials can be used, for example, in laser thermal printing system, in which the donor sheet includes an IR colorant that strongly absorbs at the wavelength of the laser. When the donor is irradiated, this absorbing material converts light energy to thermal energy and transfers the heat to the colorant in the immediate vicinity, thereby heating the colorant to its vaporization temperature for transfer to the receiver. Since the local temperature can reach as high as 600° C., infrared colorants tend to get transferred to some extent. As a result, there is some unwanted color contamination. Therefore, there is a need to have IR absorbing compounds that exhibit the same colors as the final images, so that the color contamination problem associated with laser thermal proofing can be reduced.

Secondly, there is also a need for printing inks with absorption beyond 700 nm, particularly in the near IR region. It is normally done by adding to the ink a second colorant having a separate IR chromophore, which requires co-optimization of both image ink and IR colorants. Such process is always tedious and inaccurate. Additionally, there would be an advantage to have a single compound containing both IR and image chromophore, so that there is no difference between them in term of migration rate.

In EP 499,822 A1, it is suggested to incorporate in a single molecule two independent visible colorant moieties in order to increase the visible colorant density. In U.S. Pat. No. 5,972,838, it is suggested to use a mixture of IR and visible colorants in a thermal transfer donor but this approach introduces concerns of unwanted color contamination because of unwanted incidental visible light absorption by the IR colorant and because the two colorants have different transfer rates.

It is a problem to be solved to provide an IR colorant material that exhibits good stability.

SUMMARY OF THE INVENTION

The invention provides a molecule containing a first chromophore that exhibits a first absorption maximum above 700 nm and a second chromophore that exhibits a second absorption maximum different from the first absorption maximum, wherein the absorption of the first and second chromophores are substantially independent of each other.

The molecule exhibits improved stability.

DETAILED DESCRIPTION OF THE INVENTION

As used herein, the term "colorant" refers to a compound such as a dye or pigment that absorbs electromagnetic radiation in the visible or non-visible spectrum and the term "chromophore" refers to the portion or portions of the compound that perform the absorption function in the visible or non-visible region of the spectrum. In accordance with the invention, a colorant molecule contains a first chromophore that exhibits a first absorption maximum above 700 nm and a second absorption maximum different from the first absorption maximum, typically at least 40 nm different from the first absorption maximum and usually either (a) above 700 nm or (b) from 400–700 nm, wherein the absorption of the first and second moieties are substantially independent of the presence of each other, such as where the first and second chromophores are not linked by a conjugated chain. In some imaging processes, it may be desired that the colorant molecule have a second absorption whose maximum is typically above 700 nm, below 400 nm, or visible in the range of from 400–700 nm. In the latter case, this arrangement would be useful for laser activated colorant transfer imaging. The colorants exhibit advantageous light stability. The incorporation of the chromophores in the same molecule helps to insure that the visible and IR images will be transferred at an equal rate. This enables less color contamination.

The colorant molecule may contain more than one second chromophore. These moieties may be identical and have the same maximum absorption or may be separate, separated in λ-max by at least 40 nm from the other second moieties.

The colorant molecule is represented by general formula I:

$$(IR)_m-L-(VIS)_n \qquad \text{I}$$

wherein:

L represents the non-chromophoric portions of the colorant molecule and does not conjugate the first and second chromophores;

each IR chromophore independently represents a chromophore with λ-max above 700 nm;

each VIS chromophore independently represents a chromophore with λ-max from 400–700 nm; and m and n are independently 1–6.

In a preferred embodiment, the colorant is represented by the formula II:

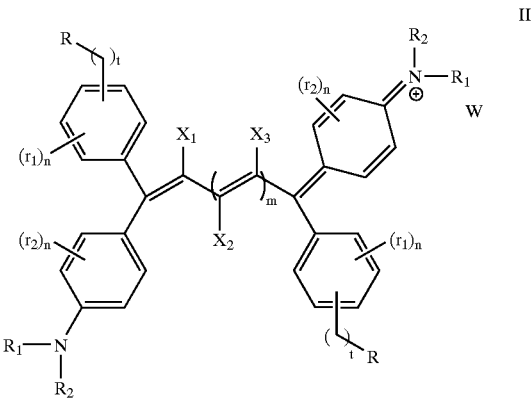

wherein:

each R independently represents hydrogen or a substituent such that at least one such group is a colored chromophore;

$X_1$, $X_2$ and $X_3$ each independently represents hydrogen, halogen, cyano, an alkyl group having 1 to 12 carbon atoms, a cycloalkyl group having 5 to 10 carbon atoms in the carbocyclic ring, an aryl group having 6 to 10 carbon atoms in the carbocyclic ring, or any two of said $X_1$, $X_2$, and $X_3$ may be joined together to complete a 5- to 7-membered carbocyclic or heterocyclic ring group, and m is 1–3;

Each of $R_1$, and $R_2$ independently represents an alkyl group having 1 to 12 carbon atoms a cycloalkyl group having 5 to 10 carbon atoms in the carbocyclic ring, an aryl group having 6 to 10 carbon atoms in the carbocyclic ring, or a heterocyclic or polymeric backbone group; provided $R_1$ and $R_2$ may be joined together to form a 5- to 7-membered heterocyclic ring group and;

each of $r_1$, $r_2$, and $r_3$ independently represents a substituent group and each n is 0–4; and each t is 0–4; and W is a monovalent counter anion to balance the charge on the colorant molecule.

A particular embodiment of the colorant is represented by formula III:

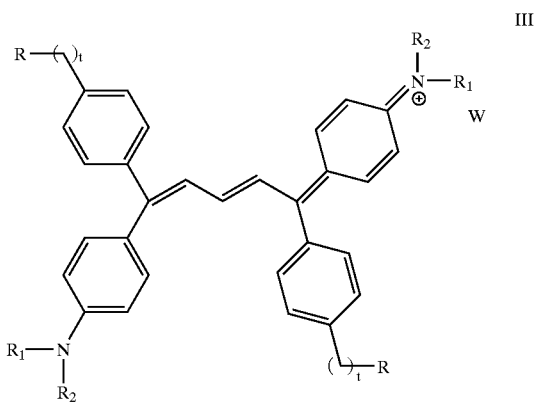

where R, t, $R_1$, $R_2$ and W are as described for formula II.

Besides the visible chromophores specifically shown herein, other useful visible chromophores may be employed including those disclosed in U.S. Pat. Nos. 4,541,830; 4,698,651; 4,695,287; 4,701,439; 4,757,046; 4,743,582; 4,769,360; and 4,753,922.

The colorants of the invention may be used alone or in combination with other colorants of the same type or with conventional IR or image colorants. The colorants with yellow, cyan, or magenta chromophores are often employed. The colorant molecules may comprise functional groups such as hydrophobic groups, solubilizing groups, blocking groups, and releasing or releasable groups. Hydrophobic colorants are usually employed.

A laser activated colorant transfer imaging donor element may conveniently employ the colorant molecule of the invention. Such elements are well-known in the art and typically use a colorant coverage of from 0.05 to 1 g/m². If the color of the visible chromophore is inherently within the same range as that of the image colorant desired, then IR and image ink ratio is fixed since they are in the same molecule, which simplifies the color-matching process Unless otherwise specifically stated, use of the term "group", "substituted" or "substituent" means any group or radical other than hydrogen. Additionally, when reference is made in this application to a compound or group that contains a substitutable hydrogen, it is also intended to encompass not only the unsubstituted form, but also its form further substituted with any substituent group or groups as herein mentioned, so long as the substituent does not destroy properties necessary for the intended utility. Suitably, a substituent group may be halogen or may be bonded to the remainder of the molecule by an atom of carbon, silicon, oxygen, nitrogen, phosphorous, or sulfur. The substituent may be, for example, halogen, such as chloro, bromo or fluoro; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, cyclohexyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired desirable properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The following are examples of colorants of the invention:

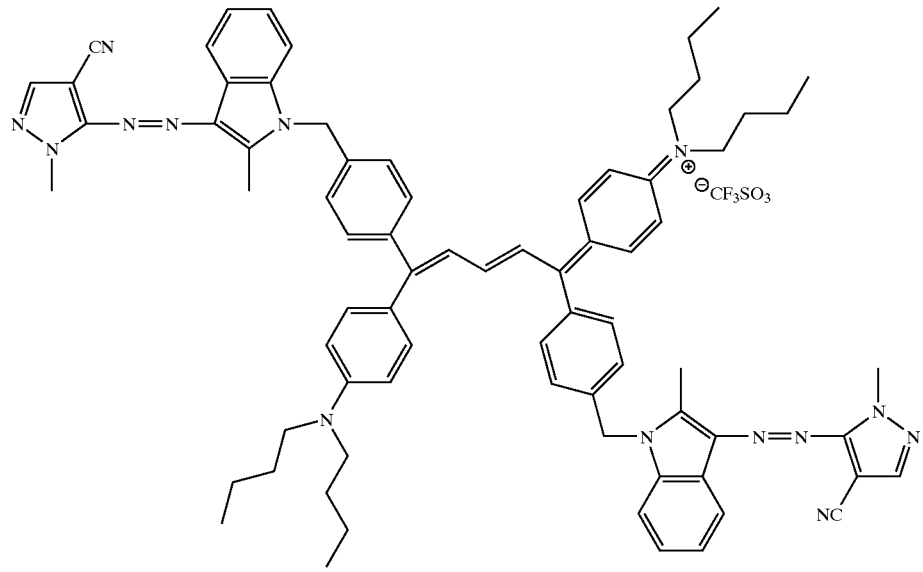

Colorant 1 ($\lambda_{max1}$ = 420 nm; $\lambda_{max2}$ = 864 nm)

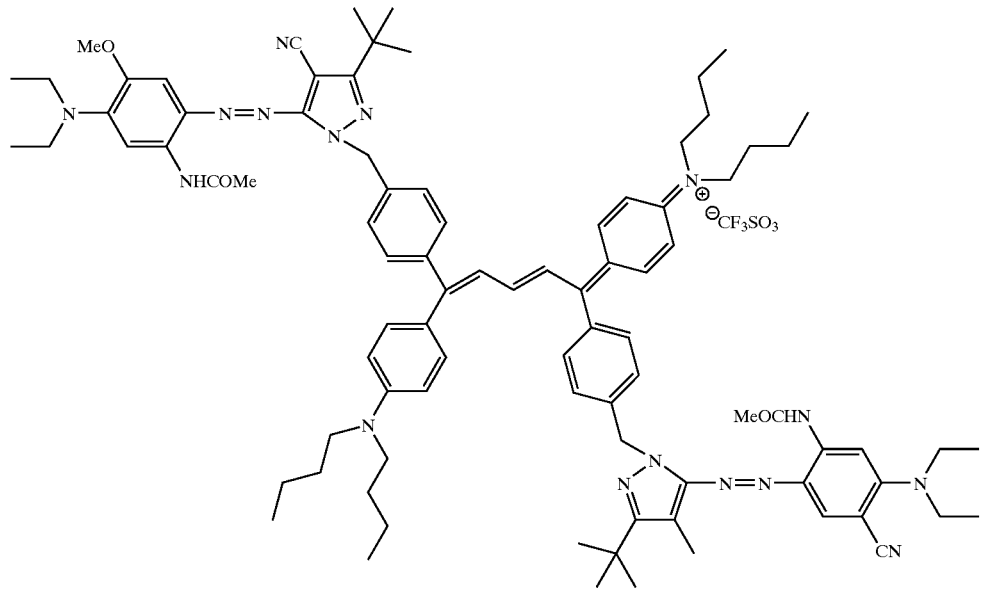

Colorant 2 ($\lambda_{max1}$ = 540 nm; $\lambda_{max2}$ = 575 nm; $\lambda_{max3}$ = 858 nm)

-continued
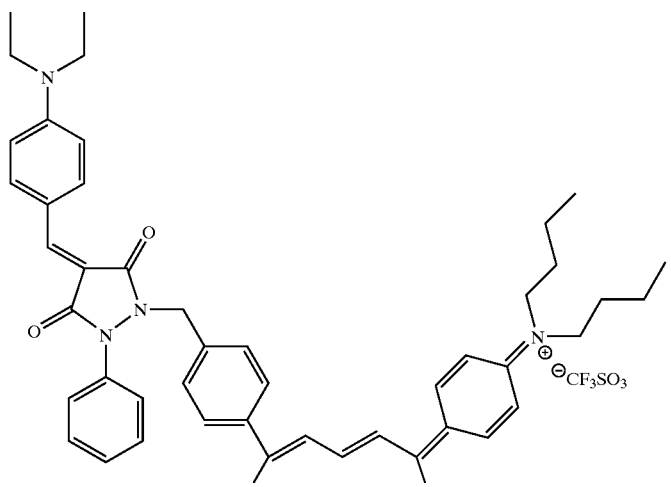
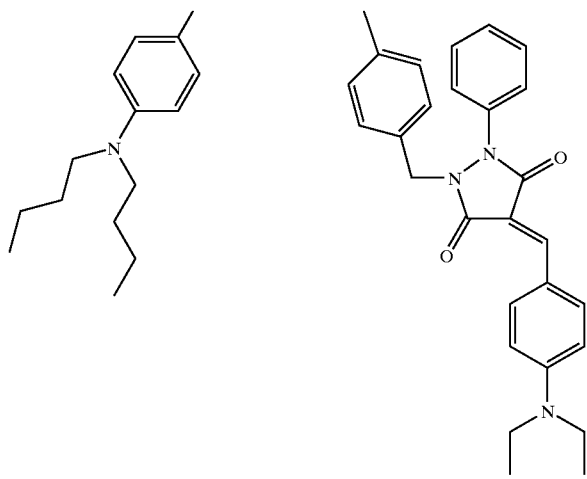
Colorant 3 (λ_max1 = 477 nm; λ_max2 = 862 nm)
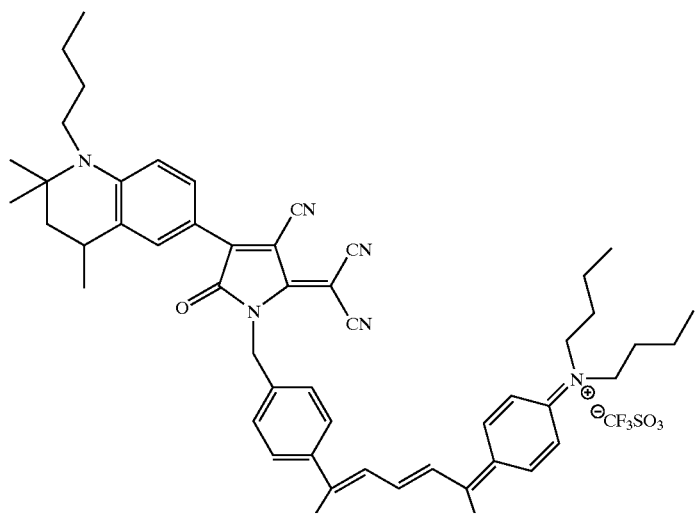

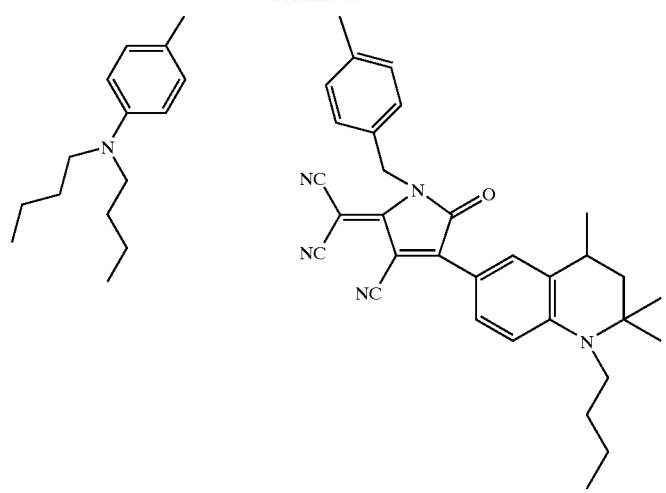
Colorant 4 ($\lambda_{max1}$ = 630 nm; $\lambda_{max2}$ = 864 nm)
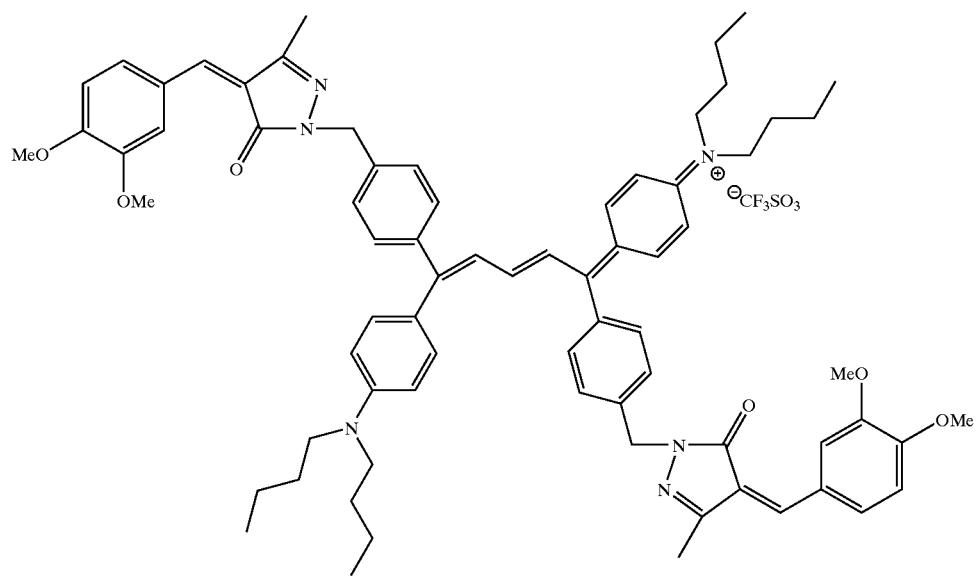
Colorant 5 ($\lambda_{max1}$ = 380 nm; $\lambda_{max2}$ = 861 nm)
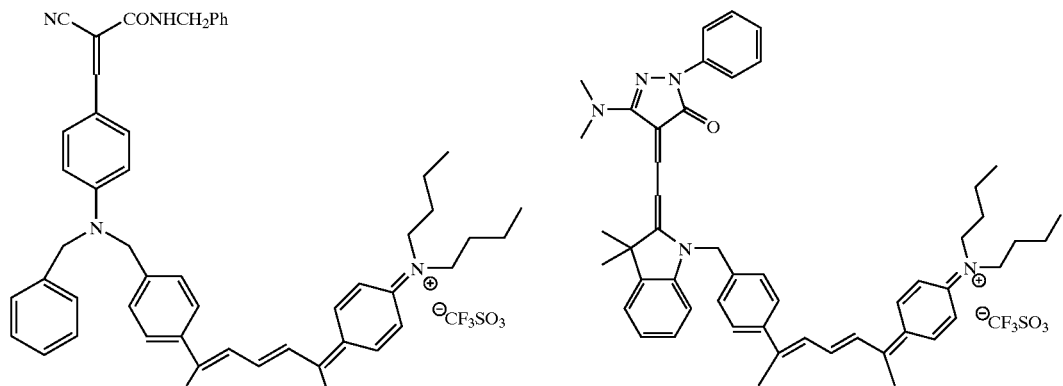

-continued
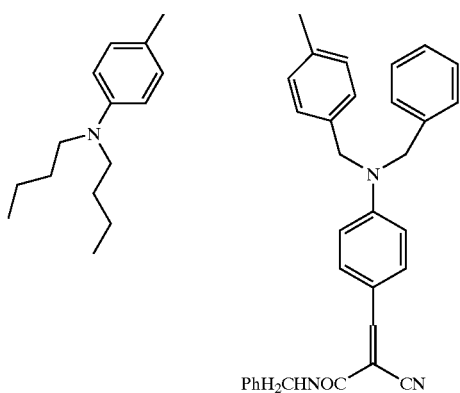
Colorant 6 (λ_max1 = 400 nm; λ_max2 = 864 nm)
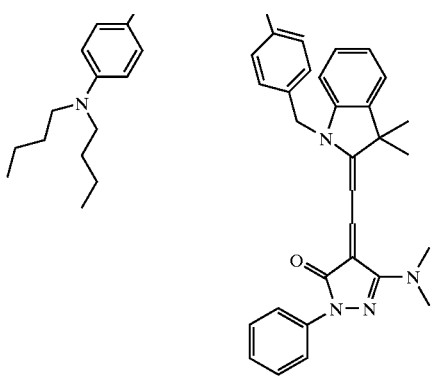
Colorant 7 (λ_max1 = 460 nm; λ_max2 = 863 nm)
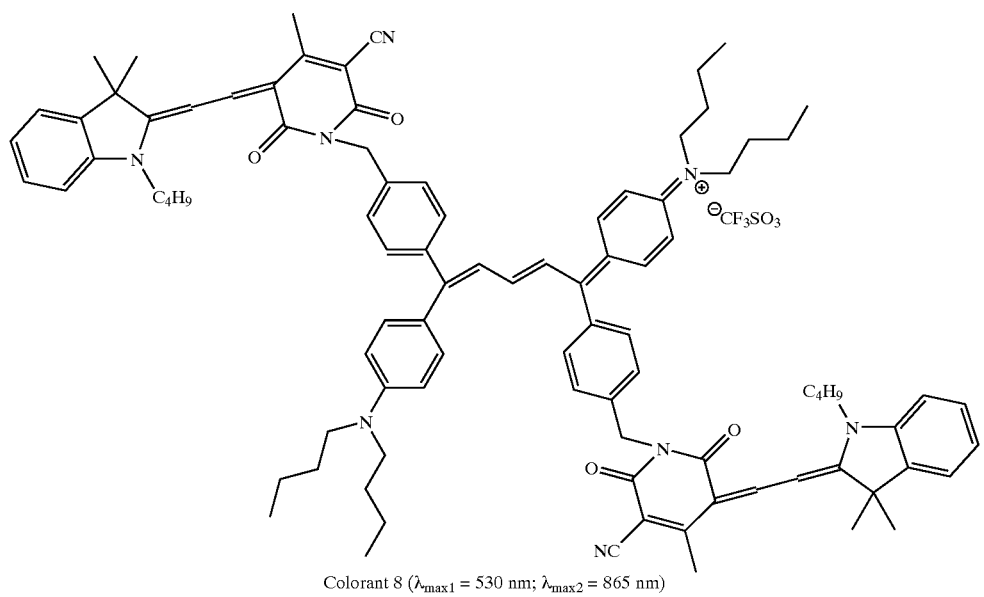
Colorant 8 (λ_max1 = 530 nm; λ_max2 = 865 nm)
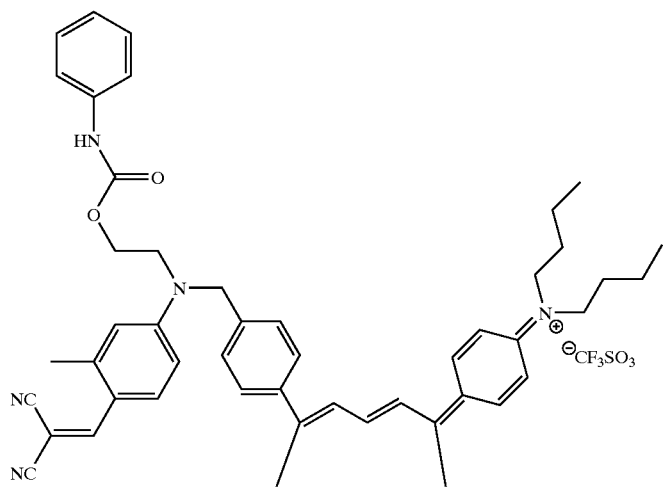

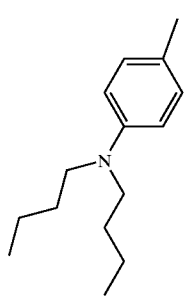
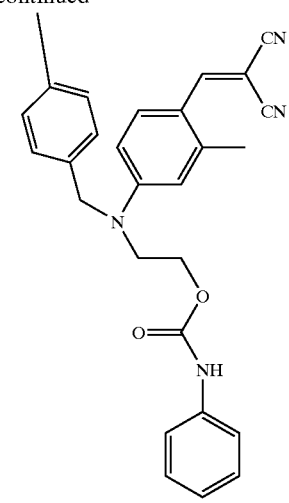
Colorant 9 (λ_max1 = 440 nm; λ_max2 = 863 nm)
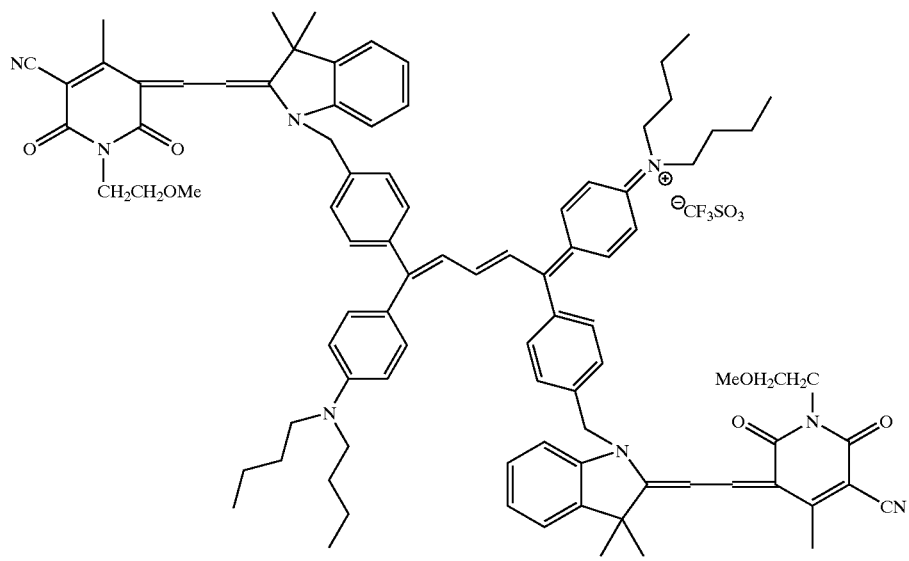
Colorant 10 (λ_max1 = 530 nm; λ_max2 = 864 nm)
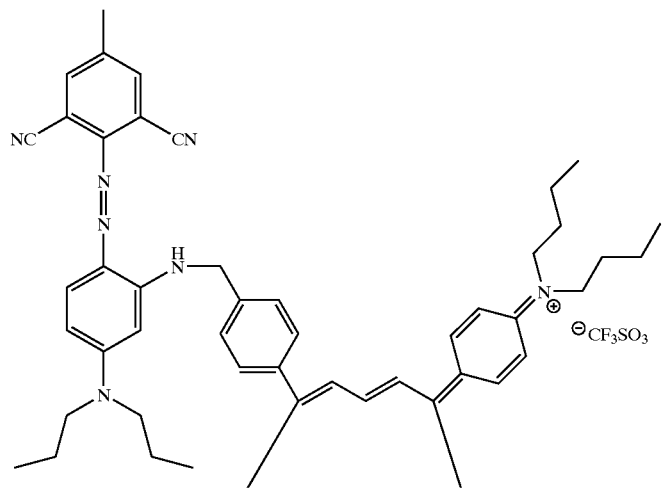

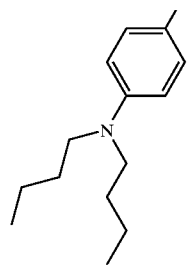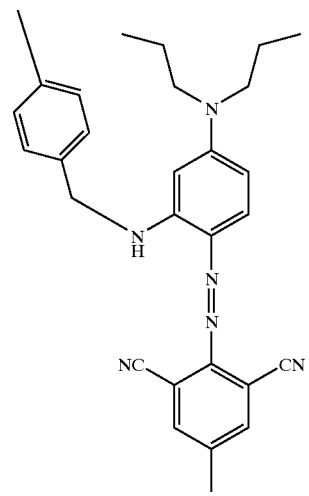
Colorant 11 ($\lambda_{max1}$ = 532 nm; $\lambda_{max2}$ = 861 nm)
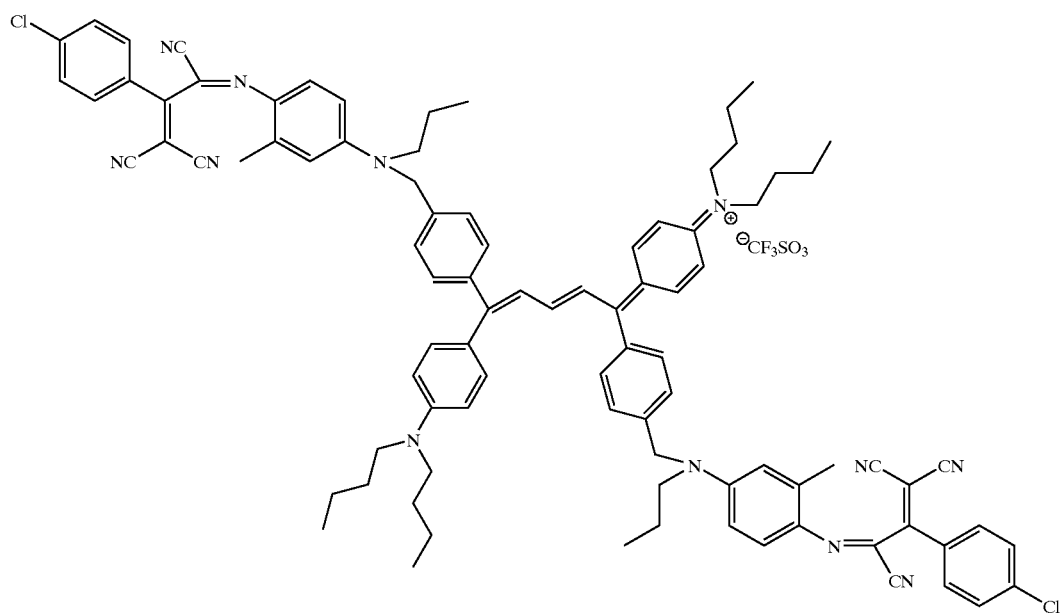
Colorant 12 ($\lambda_{max1}$ = 610 nm; $\lambda_{max2}$ = 862 nm)

-continued
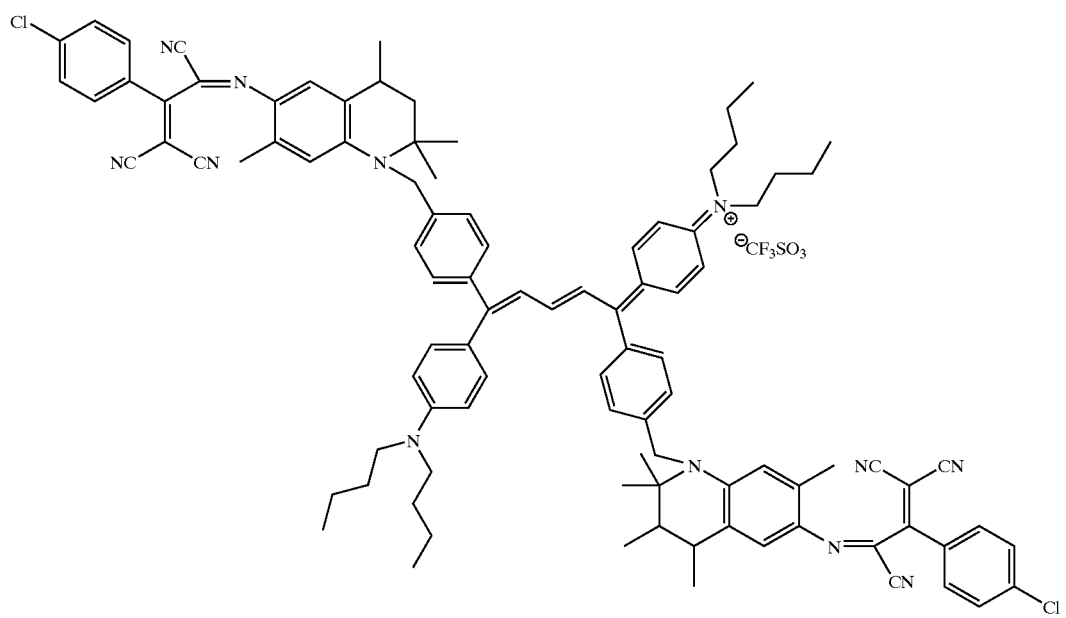
Colorant 13 ($\lambda_{max1}$ = 630 nm; $\lambda_{max2}$ = 861 nm)
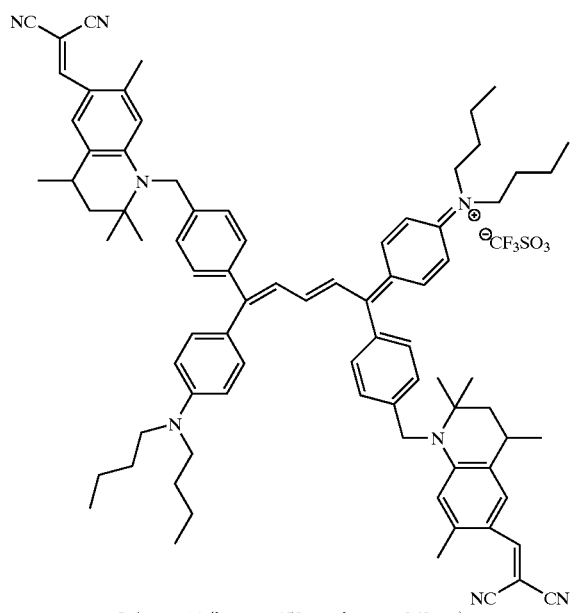
Colorant 14 ($\lambda_{max1}$ = 450 nm; $\lambda_{max2}$ = 863 nm)

-continued
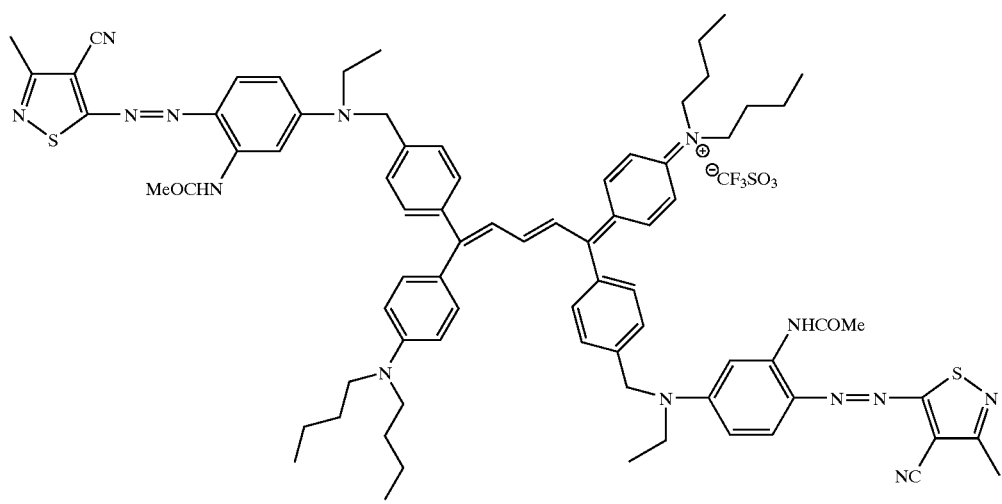
Colorant 15 ($\lambda_{max1}$ = 550 nm; $\lambda_{max2}$ = 867 nm)
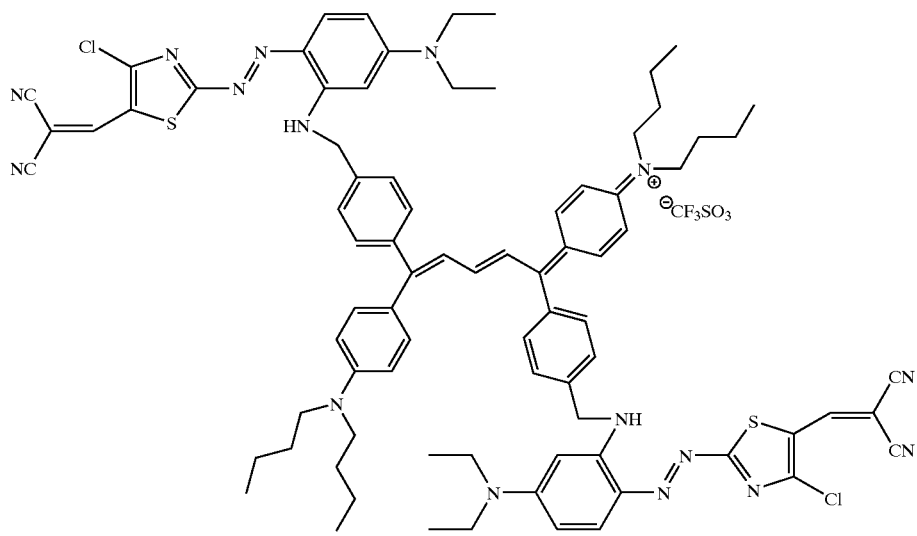
Colorant 16 ($\lambda_{max1}$ = 610 nm; $\lambda_{max2}$ = 864 nm)

-continued
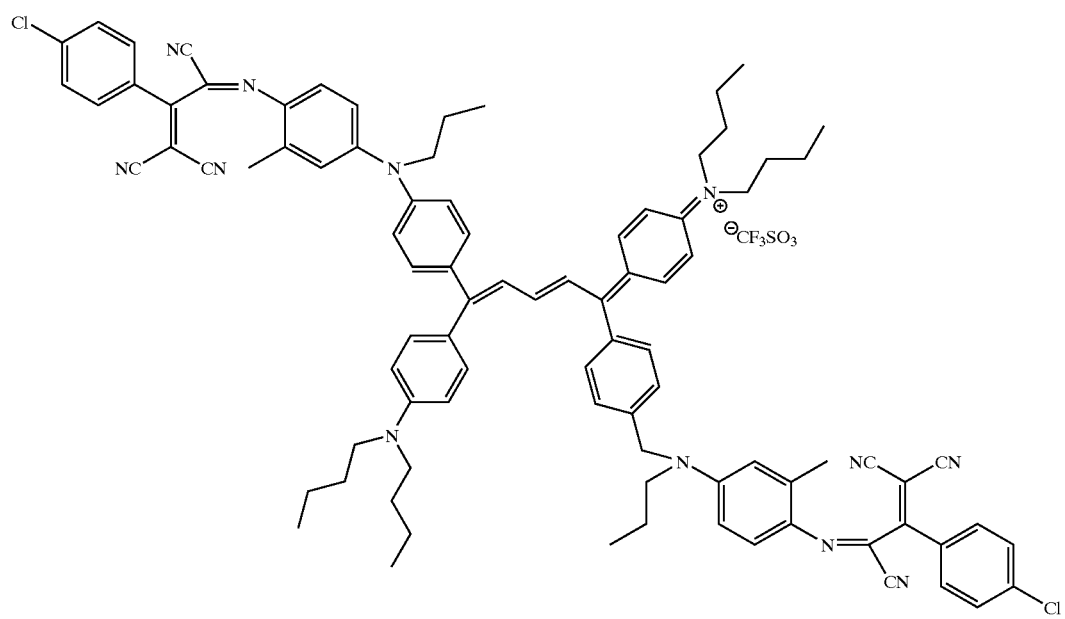
Colorant 17
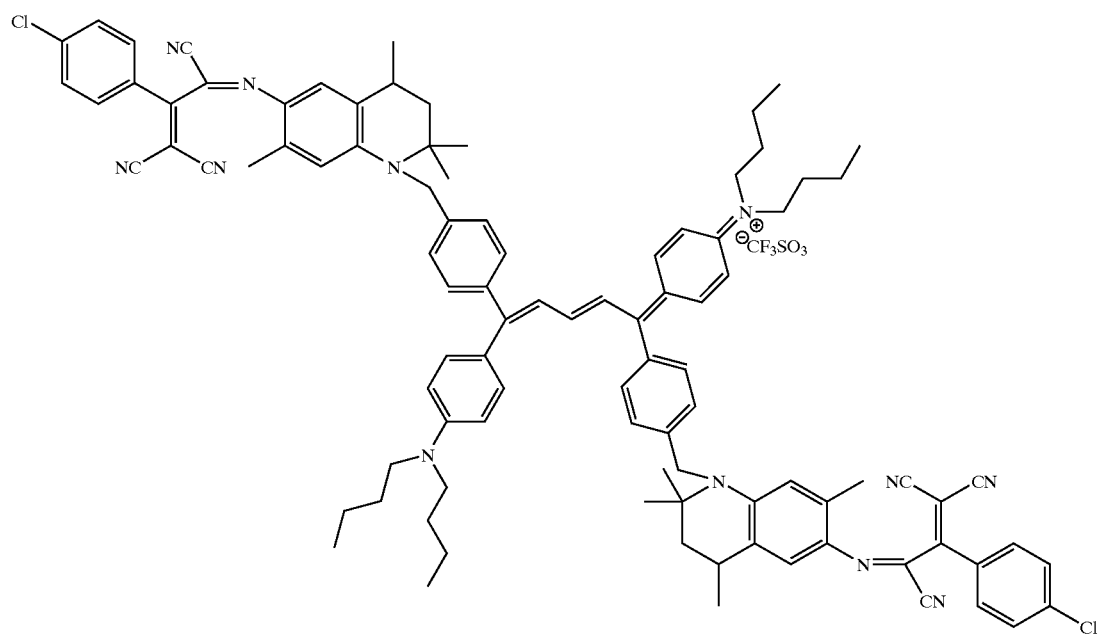
Colorant 18

-continued
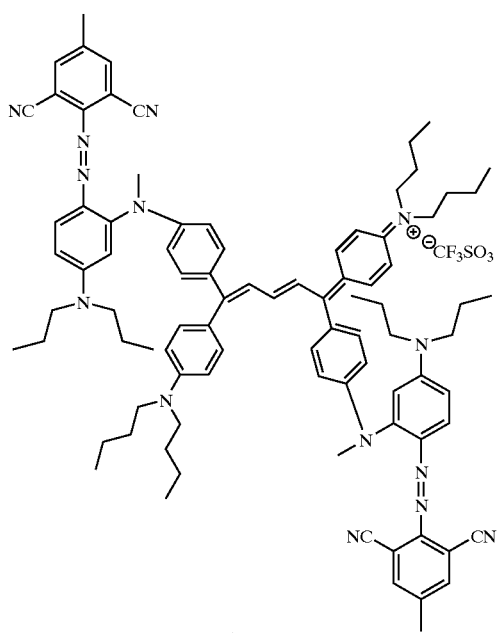
Colorant 19
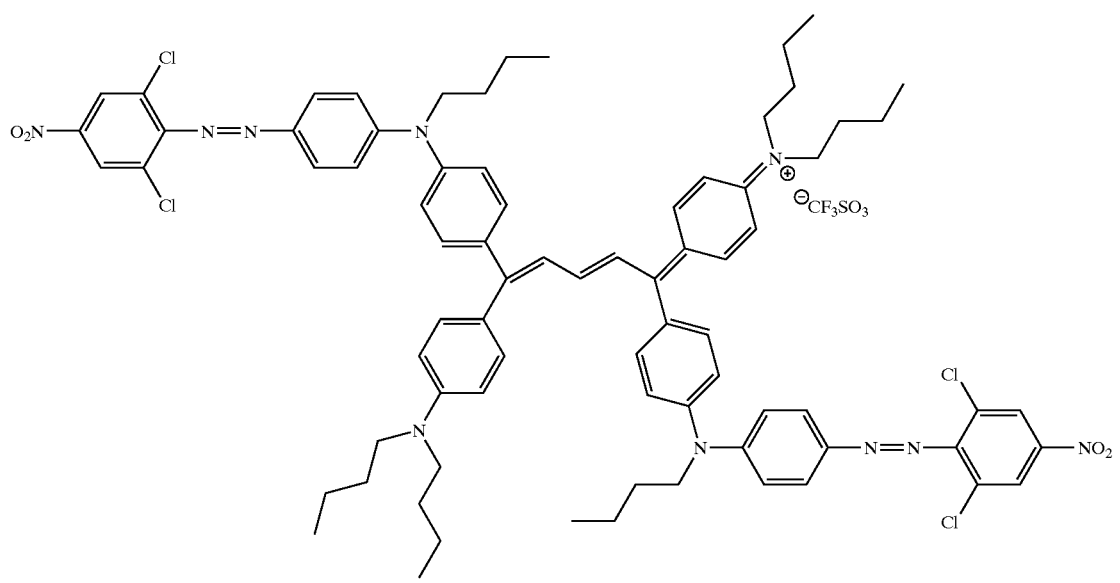
Colorant 20

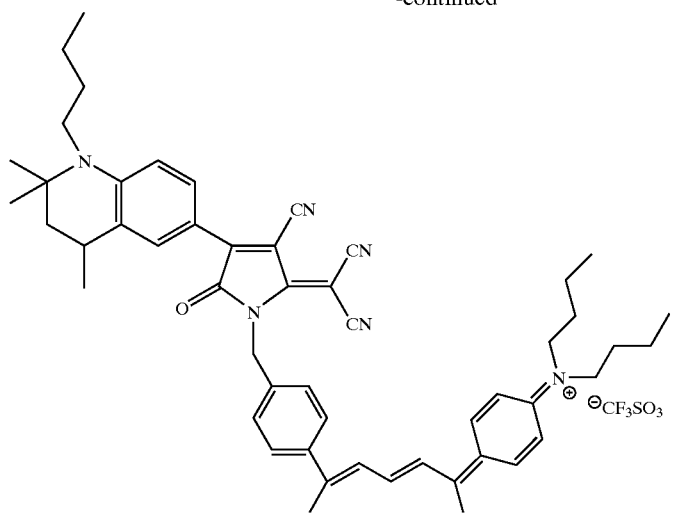
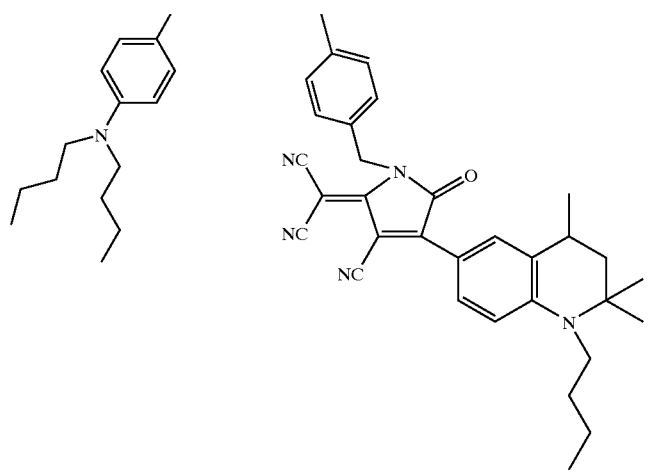
Colorant 21 ($\lambda_{max1}$ = 650 nm; $\lambda_{max2}$ = 853 nm)
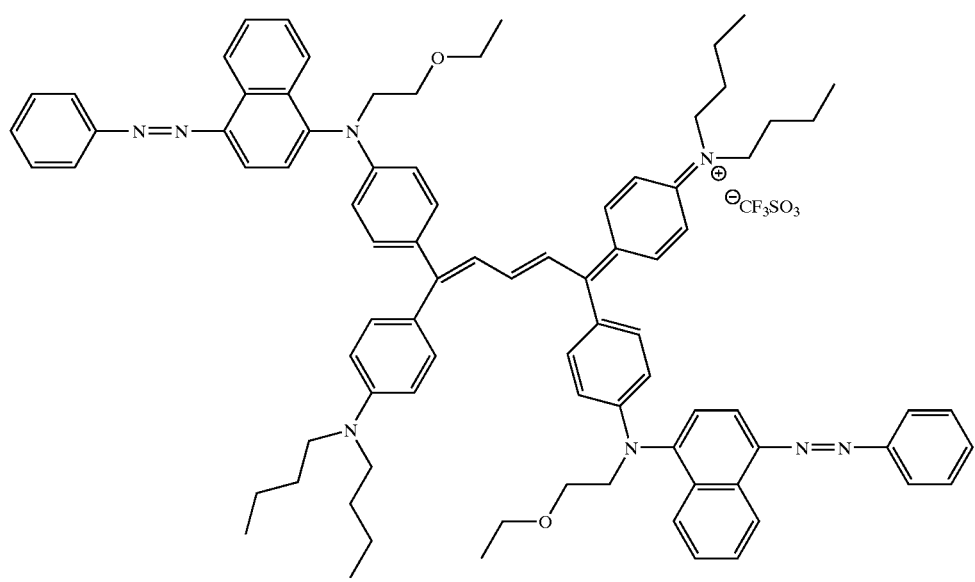
Colorant 22 ($\lambda_{max1}$ = 420 nm, $\lambda_{max2}$ = 864 nm)

Synthesis

General preparation of the colorants with t=1 of this invention is illustrated by the following synthetic scheme (Colorant 1).

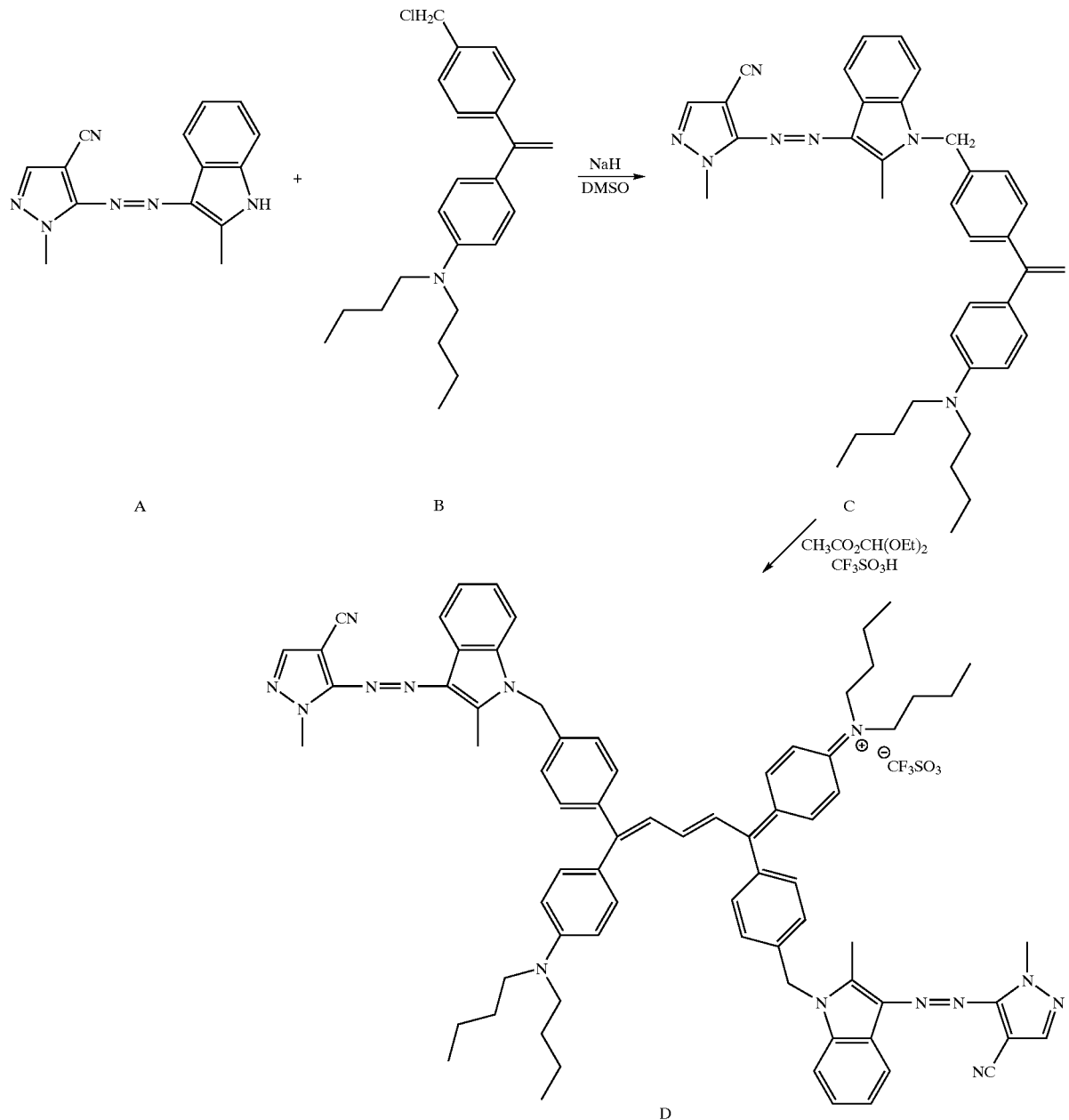

To a 200 ml round bottomed flask containing a sample of yellow colorant intermediate A (3.8 g, 14 mmoles) and DMSO (50 ml) was added sodium hydride (0.7 g, 60% in mineral oil, 17 mmoles). The resulting mixture was stirred under $N_2$ at room temperature for 0.5 hr before the intermediate B (4.3 g, 12 mmoles) was added. After overnight stirring at room temperature, the mixture was diluted with water (500 ml), a yellow solid began to precipitate from the solution, the solid was collected by filtration and washed with more water. The unreacted starting materials A and B could be removed from methanol and heptane washes respectively. 3.8 g of pure intermediate C was obtained at 54% yield.

A sample of intermediate C (3.7 g, 6.4 mmoles) was dissolved in acetic acid (25 ml), then diethoxymethyl acetate (1.62 g, 10 mmoles) was added and finally triflic acid (0.5 g, 3.3 mmoles) were added dropwise. The resulting mixture was heated to reflux for half-hour (the reaction was monitored by appearance of an ir peak at 850 nm).

The mixture was cooled with an ice-water bath and poured to a beaker containing 500 ml ether, the product started to precipitate, the solid was collected and recrystallized twice from ethanol (100 ml), 3.0 g material was obtained at 80% yield.

General preparation of the colorants with t=0 of this invention is illustrated by the following synthetic scheme (Colorant 22).

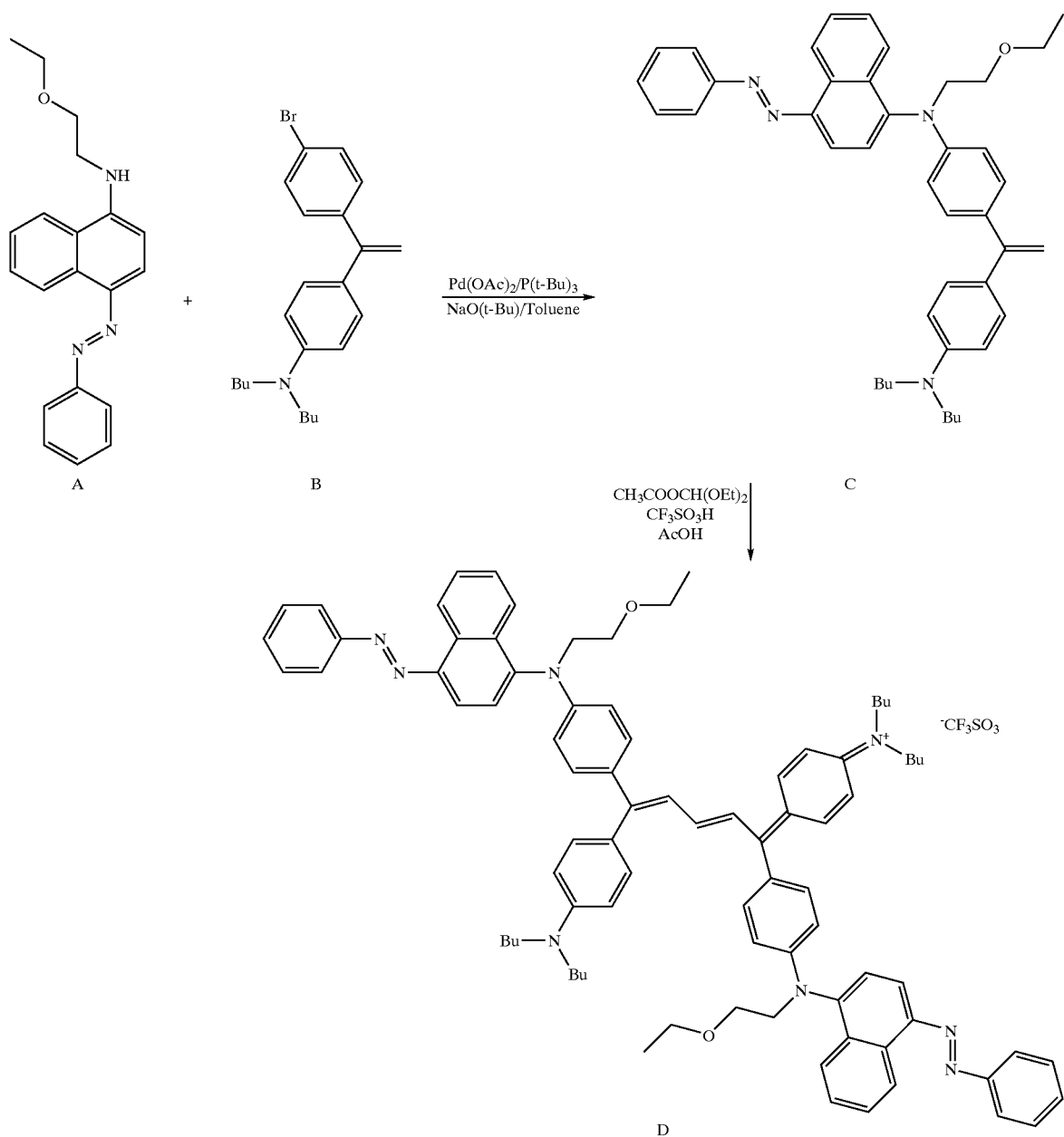

To a mixture of intermediate A (3.0 g, 9.4 mmoles) and B (3.6 g, 9.4 mmoles) in toluene (20 ml) were added under $N_2$ palladium acetate (30 mg, 0.12 mmoles), tri-t-butylphosphine (36 mg, 0.18 mmoles) and sodium-t-butyl oxide (1.4 g, 14.5 mmoles) The resulting mixture was heated at reflux for 2 hours. Water (50 ml) was added to quench the reaction, the mixture was extracted with ethyl acetate (2×50 ml), the organic layer was dried over sodium sulfate, the residual after solvent removal was purified through a silica gel column eluted with 1:1 heptane/ethyl acetate. 4.8 g of product was obtained at 82% yield.

A sample of intermediate C (3.26 g, 5 mmoles) was dissolved in acetic acid (25 ml), then diethoxymethyl acetate (1.26 g, 8 mmoles) was added and finally triflic acid (0.4 g, 3 mmoles) were added dropwise. The resulting mixture was heated to reflux for half-hour (the reaction was monitored by appearance of an ir peak at 830 nm). The mixture was cooled with an ice-water bath and poured to a beak containing 400 ml ether, the product started to precipitate, the solid was collected and recrystalized twice from ethanol (80 ml), 2.0 g product was obtained.

The colored IR colorants listed above not only provide a novel class of chromophores potentially useful for many applications, they also provide additional advantage, i.e., stabilities. They may be used in any desired form such as solutions, dispersions, or suspensions. The following examples are provided to illustrate such advantage of the invention.

EXAMPLES

IR colorant samples listed below are used as control compounds in order to demonstrate the advantage of the present invention. These control compounds are either mixtures (C1 to C-5) of IR and Image Colorant (1:2 ratio) or other infrared colorants (C-6 to C-9) that have substantial absorption in the visible portion of the electromagnetic absorption range. Control colorants C-6 to C-8 were obtained through the preparation described in U.S. Pat. No. 6,248,886 and U.S. Pat. No. 6,248,893. Colorant C-9 was prepared according to the method described in the published literature (J. Chem. Res. Synpos. (1990), (2), 50–51).

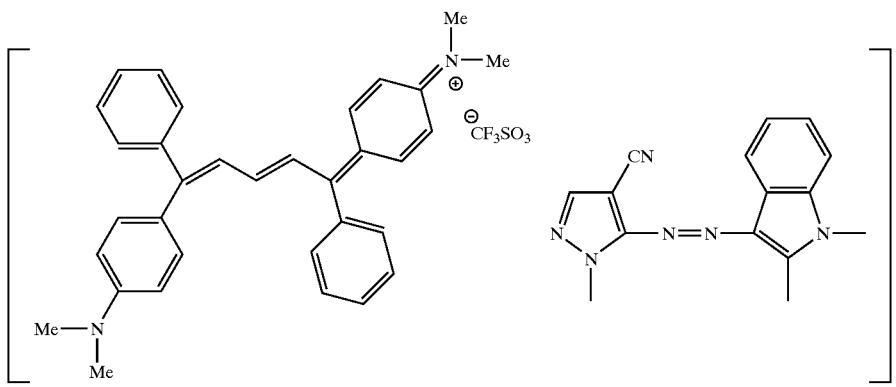

C-1

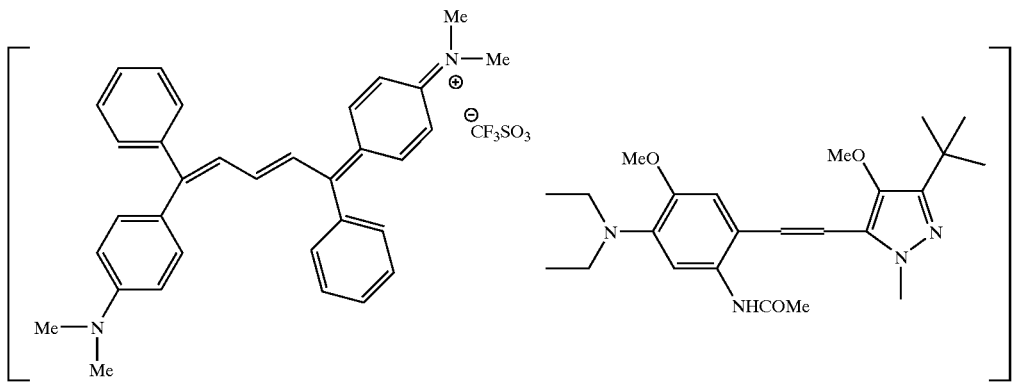

C-2

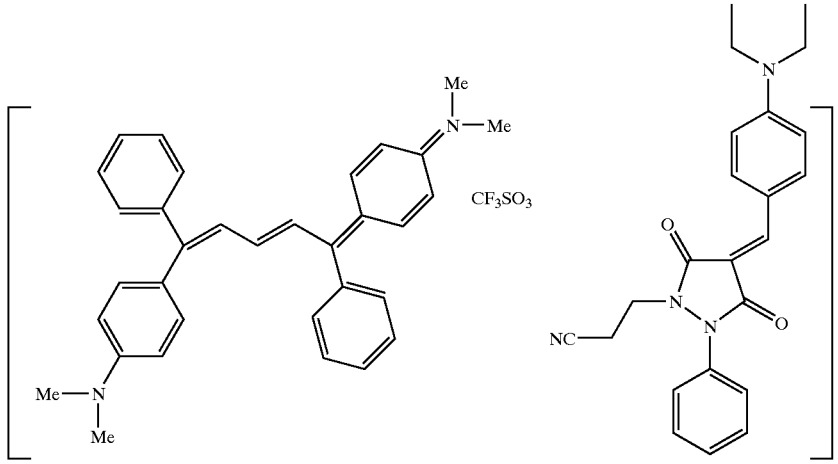

C-3

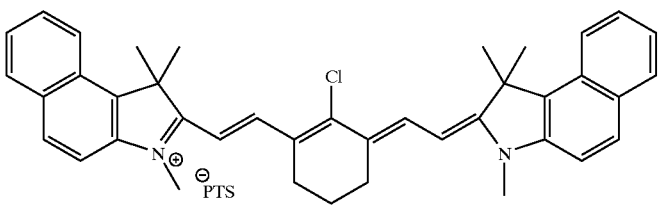

C-4

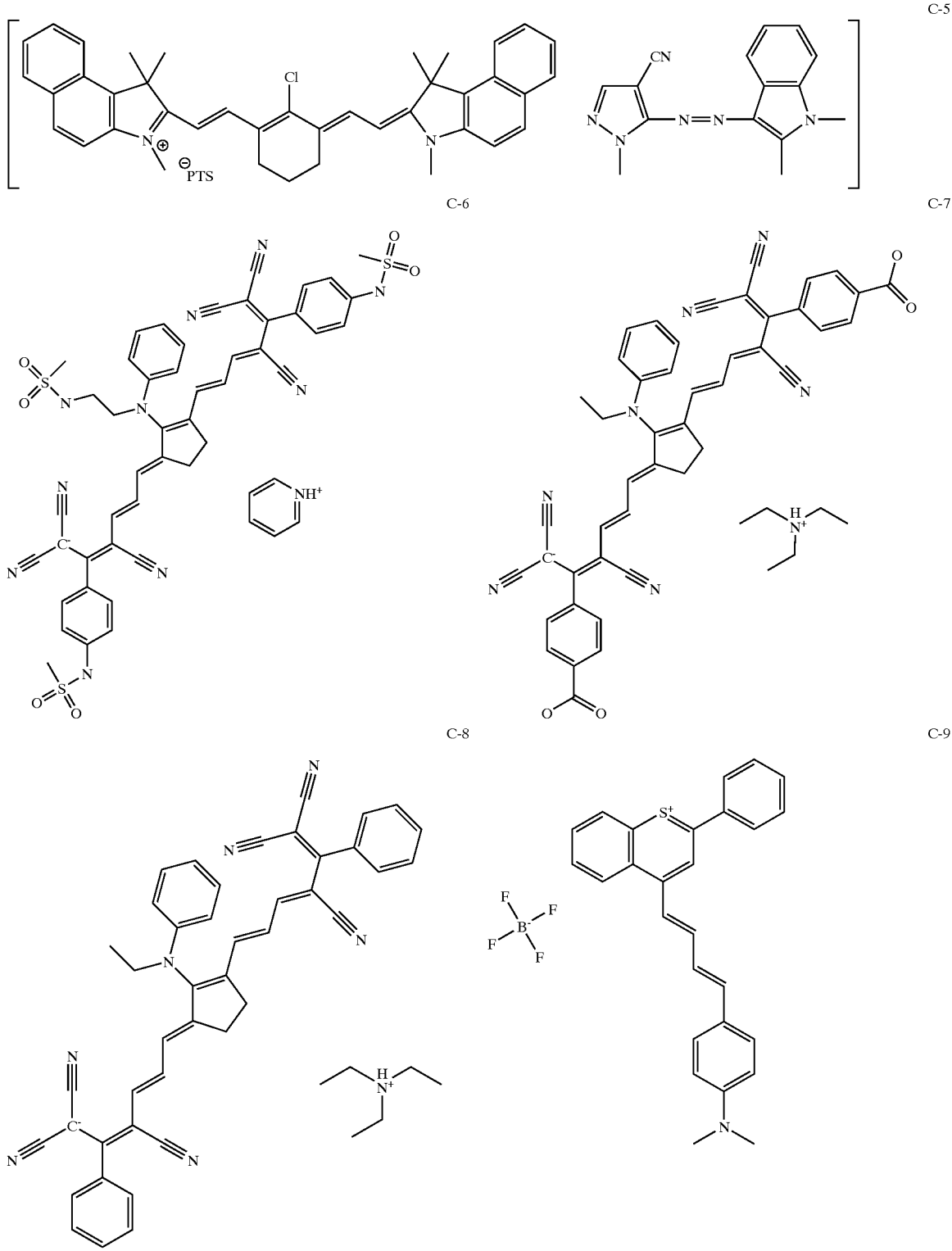

Example 1

Light Stability

Element 1 of the Invention

This element was prepared by coating on a poly(ethyleneterephthalate) support Colorant 1 at 0.1 g/m² in a cellulose acetate propionate binder at 0.5 g/m². The solvent used for the coating was a 70/30 v/v mixture of methyl isobutyl ketone and 3A alcohol.

Element 2 of the Invention

This element was the same as Element 1 except that Colorant 1 was replaced with Colorant 2.

Element 3 of the Invention

This element was the same as Element 1 except that Colorant 1 was replaced with Colorant 3.

Control Element CE-1

This element was the same as Element 1 except that Colorant 1 was replaced with comparative colorant sample C-1.

Control Element CE-2

This element was the same as Element 1 except that Colorant 1 was replaced with comparative colorant sample C-2.

Control Element CE-3

This element was the same as Element 1 except that Colorant 1 was replaced with comparative colorant sample C-3.

Control Element CE-4

This element was the same as Element 1 except that Colorant 1 was replaced with comparative colorant sample C-4.

Control Element CE-5

This element was the same as Element 1 except that Colorant 1 was replaced with comparative colorant sample C-5.

The above elements were placed under fluorescent room light conditions for a period of 4 weeks. To calculate the percent optical density loss, from the optical density value at λ-max before light exposure the optical density value after light exposure was subtracted. The resulting value was divided by the optical density value before light exposure and multiplied by one hundred. Results are presented in Table 1:

TABLE 1

| Colorant No. | Type | % Optical Density Loss After 4 Weeks at IR λ-max |
|---|---|---|
| C-1 | Comp | 24.12 |
| C-4 | Comp | 57.02 |
| C-5 | Comp | 95.84 |
| 1 | Inv | 13.64 |
| C-2 | Comp | 10.73 |
| 2 | Inv | 9.18 |
| C-3 | Comp | 22.03 |
| 3 | Inv | 16.76 |

The data of Table 1 is grouped so as to make comparison between colorants of similar structure easier. The table shows that, for the colorants tested, the colorants within the invention are much more stable than the comparison colorants. The covalent attachment of colored chromophores for Colorants 1, 2, and 3 exhibit a lower loss of density under light exposure conditions.

Example 2

Dark Stability

Example 1 was repeated except that the elements were placed into a dark black box with constant dry airflow for a period of 24 hours to 4 weeks.

Control Element CE-6

This element was the same as Element 1 except that Colorant 1 was replaced with comparative colorant sample C-6.

Control Element CE-7

This element was the same as Element 1 except that Colorant 1 was replaced with comparative colorant sample C-7.

Control Element CE-8

This element was the same as Element 1 except that Colorant 1 was replaced with comparative colorant sample C-8.

Control Element CE-9

This element was the same as Element 1 except that Colorant 1 was replaced with comparative colorant sample C-9.

All colorants (Colorant 1 to Colorant 16) provided by the invention showed excellent dark stability; virtually no density loss is observed over a period of 4 weeks. On the other hand, other infrared colorants (comparative C6 to C9), that have substantial absorption in the visible portion of the electromagnetic absorption range, are readily decomposed compared to the inventive colorants in the dark (see Table 2).

TABLE 2

| IR Colorant Sample | $\lambda max_1$, $\lambda max_2$ (nm) | 24 Hours in Dark % IR Colorant Density Loss |
|---|---|---|
| C-6 | 700, 870 | 31 |
| C-7 | 700–900 | 15 |
| C-8 | 610, 815 | 30 |
| C-9 | 712, 845 | 31 |
| Inventive Colorant 1 to Colorant 16 | See λmax values with formulas | ~0 |

Table 2 illustrates the advantage of the inventive colorants from a dark stability standpoint. Although the control colorants above have been shown to be useful for various applications as described in the already referenced publications, they decomposed readily in the dark compared to the inventive colorants. This property would be undesirable in applications where the absorption and the inherent visible color is meant to add to the permanent color density of an image. This stability requirement is often essential in digital proofing where the undesirable transfer of colored IR colorant is offset by the visible portion of the colorant in the final colorimetry.

Example 3

Wet-Oven Stability

Example 1 was repeated except that the elements were placed in a wet-oven chamber (38° C./90RH) for four weeks. The following results were obtained:

TABLE 3

| Colorant No. | Type | % Optical Density Loss After 4 Weeks at IR λmax |
|---|---|---|
| C-1 | Comp | 8.23 |
| C-4 | Comp | 57.02 |
| C-5 | Comp | 10.86 |
| 1 | Inv | 2.06 |
| C-2 | Comp | 5.80 |
| 2 | Inv | 2.74 |
| C-3 | Comp | 7.89 |
| 3 | Inv | 0.70 |

This example shows that the inventive colorants tested exhibited a reduced optical density loss under high humidity conditions vs the comparisons.

The entire contents of the patents and other publications referred to in this specification are incorporated herein by reference.

What is claimed is:

1. A molecule containing a first chromophore that exhibits a first absorption maximum above 700 nm and a second chromophore that exhibits a second absorption maximum different from the first absorption maximum, wherein the absorption of the first and second chromonhores are substantially independent of each other, and wherein the second absorption maximum is from 400–700 nm.

2. A molecule containing a first chromophore that exhibits a first absorption maximum above 700 nm and more than one second chromophore that exhibits a second absorption maximum different from the first absorption maximum, wherein the absorption of the first and second chromonhores are substantially independent of each other.

3. The molecule of claim 2 wherein the second chromophores are separated from each other in λ-max by at least 10 nm.

4. The molecule of claim 2 wherein the second chromophores have the same λ-max.

5. A molecule containing a first chromophore that exhibits a first absorption maximum above 700 nm and a second chromophore that exhibits a second absorption maximum different from the first absorption maximum, wherein the absorption of the first and second chromophores are substantially independent of each other, and wherein the first and second chromopores are separated in λ-max by at least 10 nm.

6. The molecule of claim 5 wherein the first and second chromopores are typically separated in λ-max by 40 nm.

7. A molecule containing a first chromophore that exhibits a first absorption maximum above 700 nm and a second chromophore that exhibits a second absorption maximum different from the first absorption maximum, wherein the absorption of the first and second chromophores are substantially independent of each other, wherein the molecule is represented by a general formula:

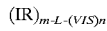

$(IR)_m\text{-}L\text{-}(VIS)_n$  I wherein:

L represents the non-chromophoric portions of the molecule and does not conjugate the first and second chromophores;

each IR chromophore independently represents a chromophore with λ-max above 700 nm;

each VIS chromophore independently represents a chromophore with λ-max from 400–700; and m and n are independently 1–6.

8. The molecule of claim 7 wherein the IR chromophore is a tetra-aryl methine group.

9. The molecule of claim 7 wherein the VIS chromophore exhibits a λ-max in the range of 400–500 nm.

10. The molecule of claim 7 wherein the VIS chromophore exhibits a λ-max in the range of 500–600 nm.

11. The molecule of claim 7 wherein the VIS chromophore exhibits a λ-max in the range of 600–700 nm.

12. A molecule containing a first chromophore that exhibits a first absorption maximum above 700 nm and a second chromophore that exhibits a second absorption maximum different from the first absorption maximum and is above 700 nm, wherein the absorption of the first and second chromophores are substantially independent of each other, wherein the molecule is represented by the formula II:

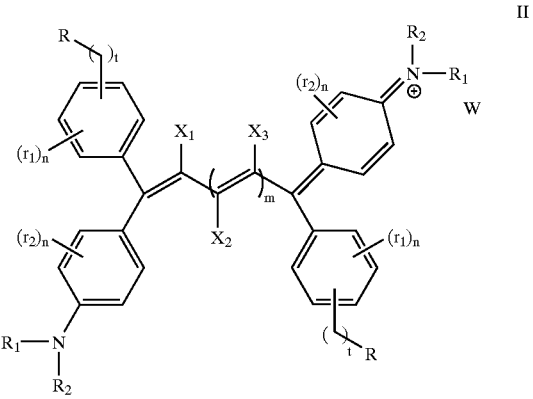

wherein:
each R independently represents hydrogen or a substituent such that at least one such group is a colored chromophore;

$X_1$, $X_2$ and $X_3$ each independently represents hydrogen, halogen, cyano, an alkyl group having 1 to 12 carbon atoms, a cycloalkyl group having 5 to 10 carbon atoms in the carbocyclic ring, an aryl group having 6 to 10 carbon atoms in the carbocyclic ring, or any two of said $X_1$, $X_2$, and $X_3$ may be joined together to complete a 5- to 7-membered carbocyclic or heterocyclic ring group, and m is 1–3;

each of $R_1$, and $R_2$ independently represents an alkyl group having 1 to 12 carbon atoms a cycloalkyl group having 5 to 10 carbon atoms in the carbocyclic ring, an aryl group having 6 to 10 carbon atoms in the carbocyclic ring, or a heterocyclic or polymeric backbone group; provided $R_1$ and $R_2$ may be joined together to form a 5- to 7-membered heterocyclic ring group and;

each of $r_1$ and $r_2$ independently represents a substituent group, and each n is 0–4, and each t is 0–4; and W is a monovalent counter anion to balance the charge on the molecule.

13. The molecule of claim 12 wherein the colored chromophores are selected from yellow, cyan, and magenta.

14. The molecule of claim 1 comprising hydrophobic groups, solubilizing groups, blocking groups, and releasing or releasable groups.

15. The molecule of claim 1 wherein the first and second chromophores are not linked by a conjugated chain.

16. The molecule of claim 12 having formula III:

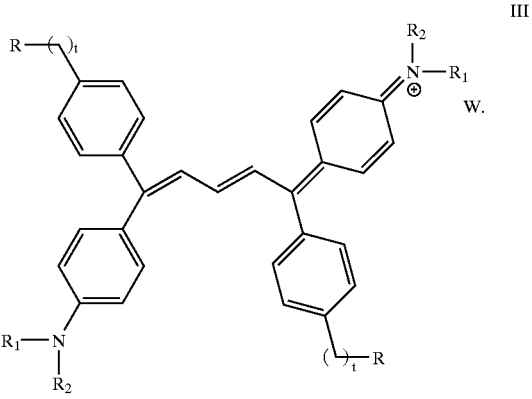

17. A dispersion containing the molecule of claim 1.
18. A suspension containing the molecule of claim 1.
19. A bichromophoric molecule selected from the group consisting of:

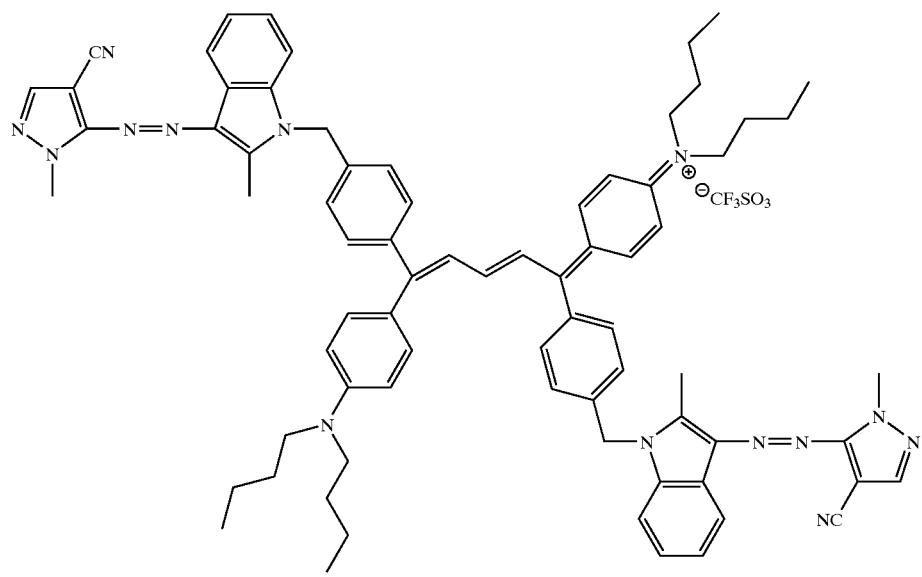
Colorant 1 ($\lambda_{max1}$ = 420 nm; $\lambda_{max2}$ = 864 nm)
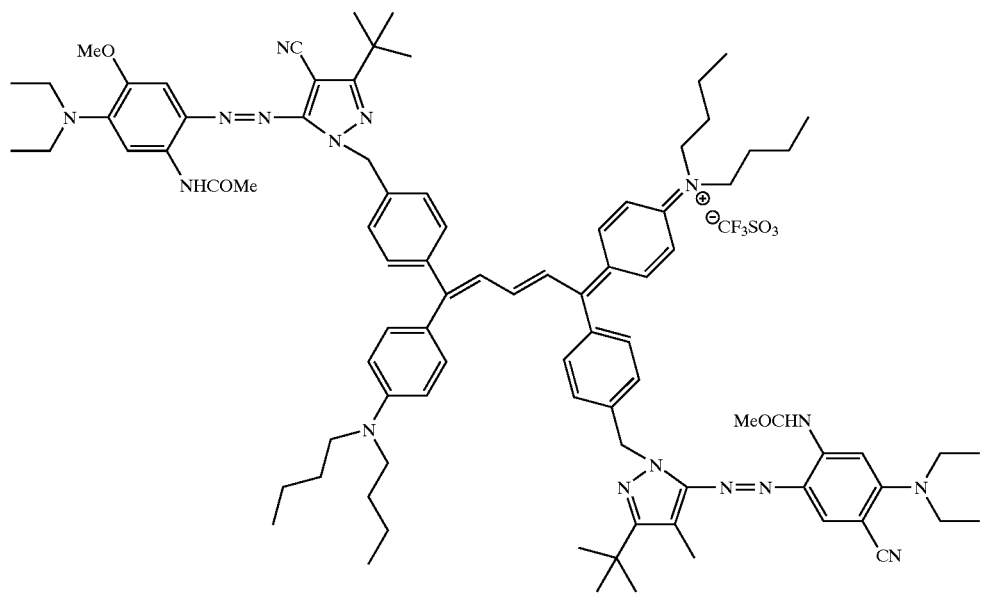
Colorant 2 ($\lambda_{max1}$ = 540 nm; $\lambda_{max2}$ = 575 nm; $\lambda_{max3}$ = 858 nm)
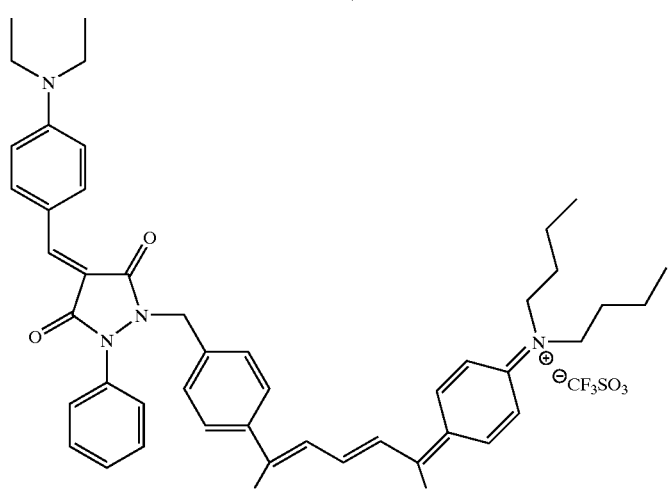

-continued
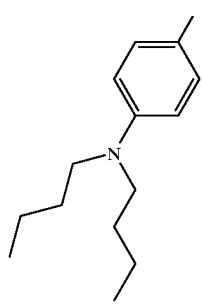
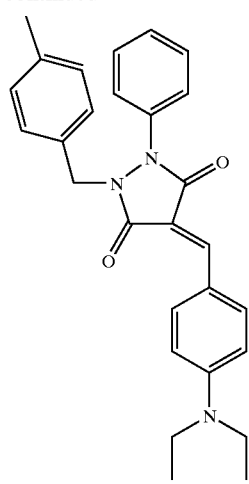
Colorant 3 (λ_max1 = 477 nm; λ_max2 = 862 nm)
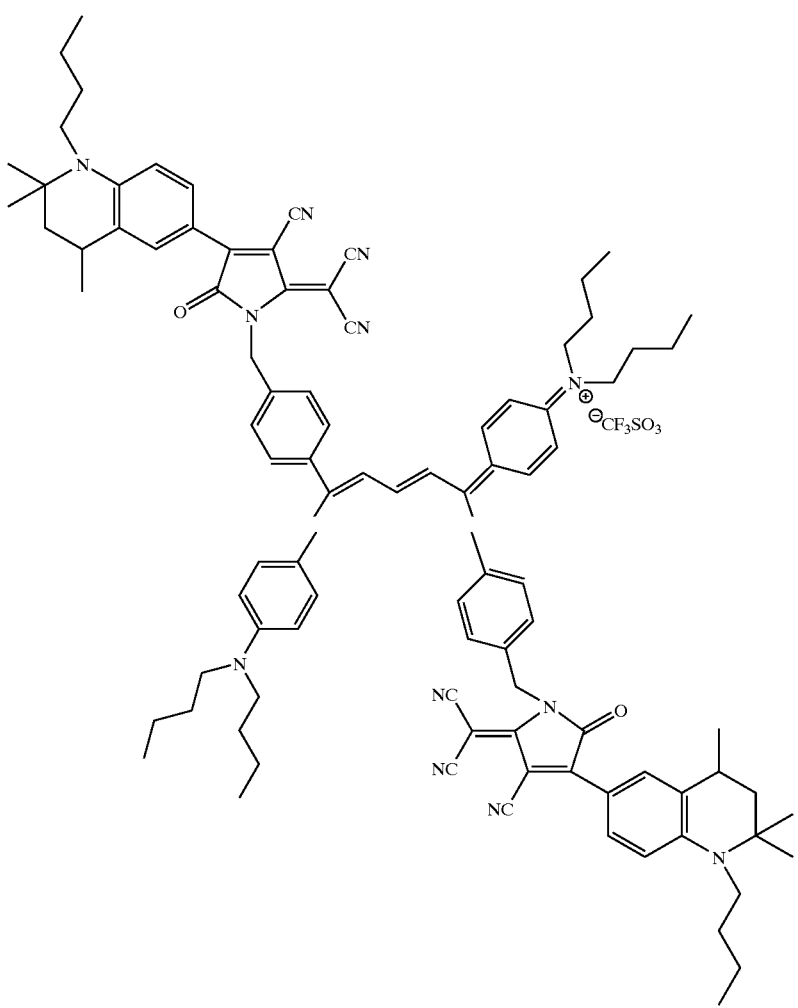
Colorant 4 (λ_max1 = 630 nm; λ_max2 = 864 nm)

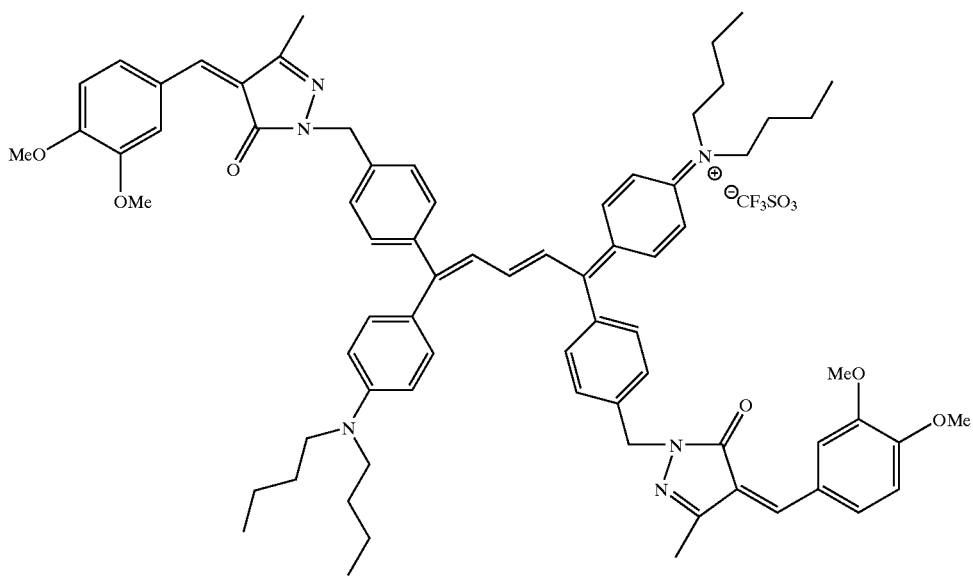
Colorant 5 (λ$_{max1}$ = 380 nm; λ$_{max2}$ = 861 nm)
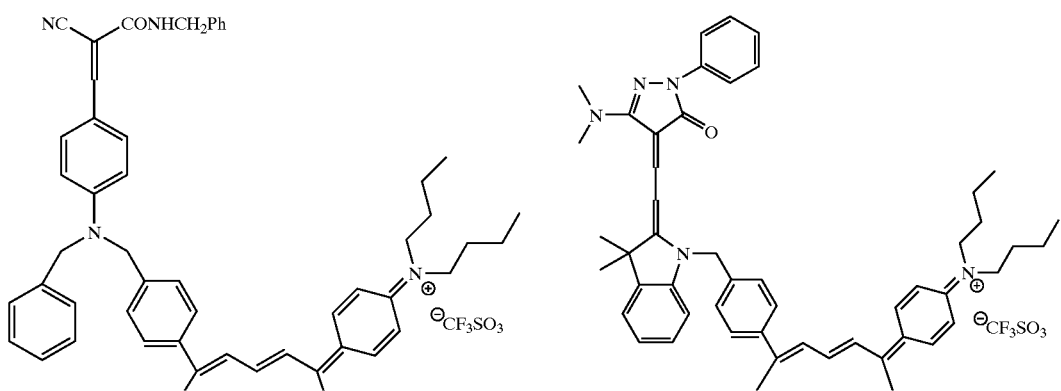
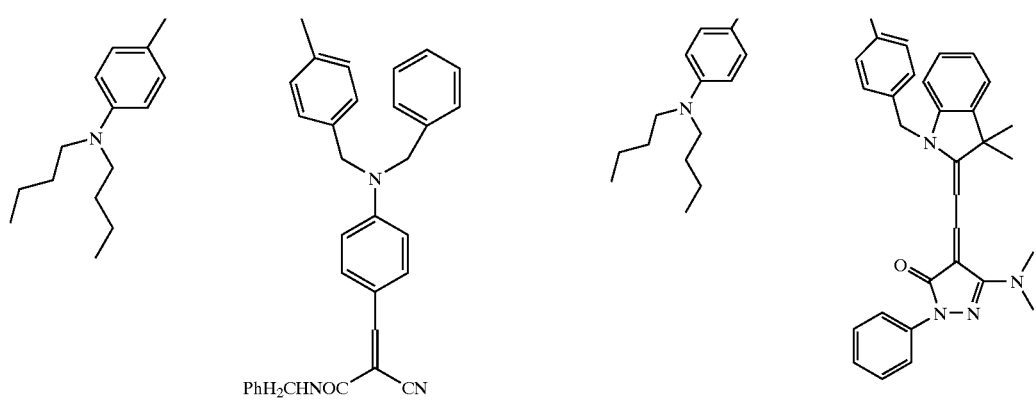
Colorant 6 (λ$_{max1}$ = 400 nm; λ$_{max2}$ = 864 nm)            Colorant 7 (λ$_{max1}$ = 460 nm; λ$_{max2}$ = 863 nm)

-continued
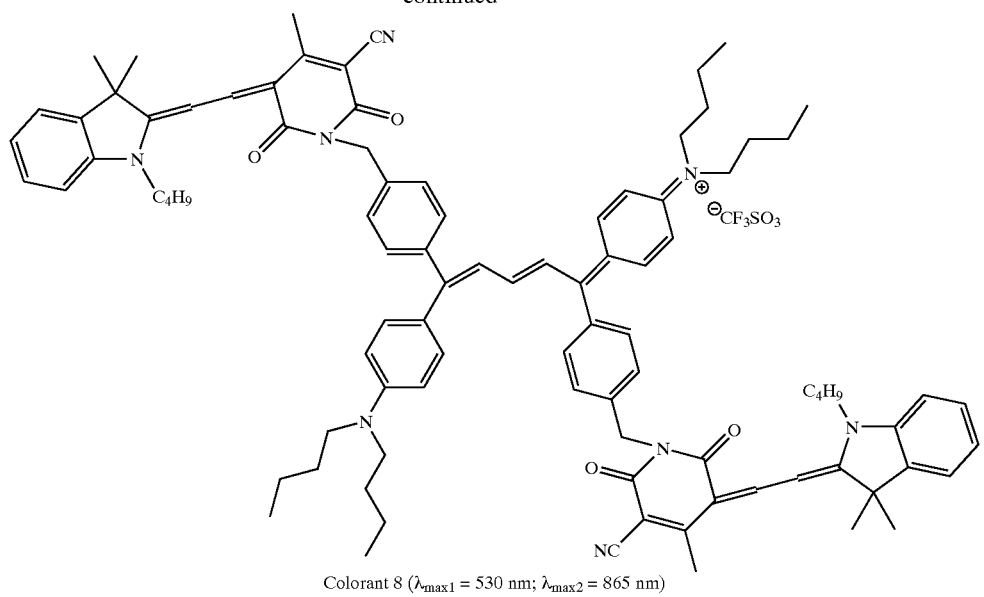
Colorant 8 (λ$_{max1}$ = 530 nm; λ$_{max2}$ = 865 nm)
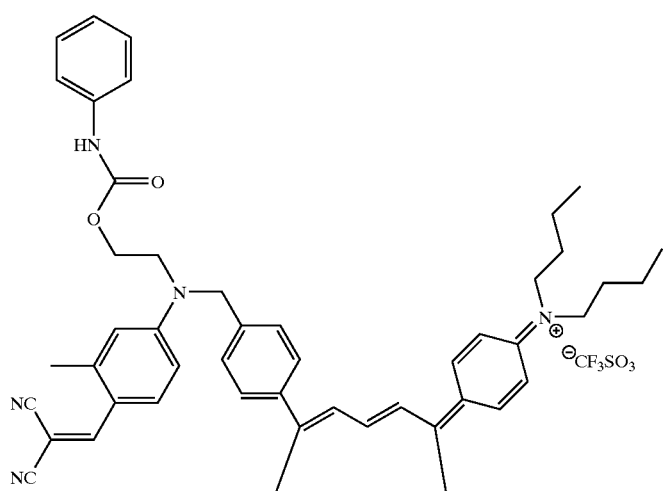
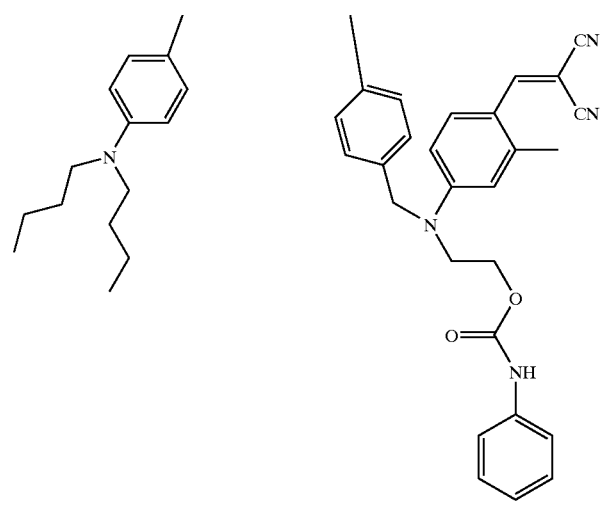
Colorant 9 (λ$_{max1}$ = 440 nm; λ$_{max2}$ = 863 nm)

-continued
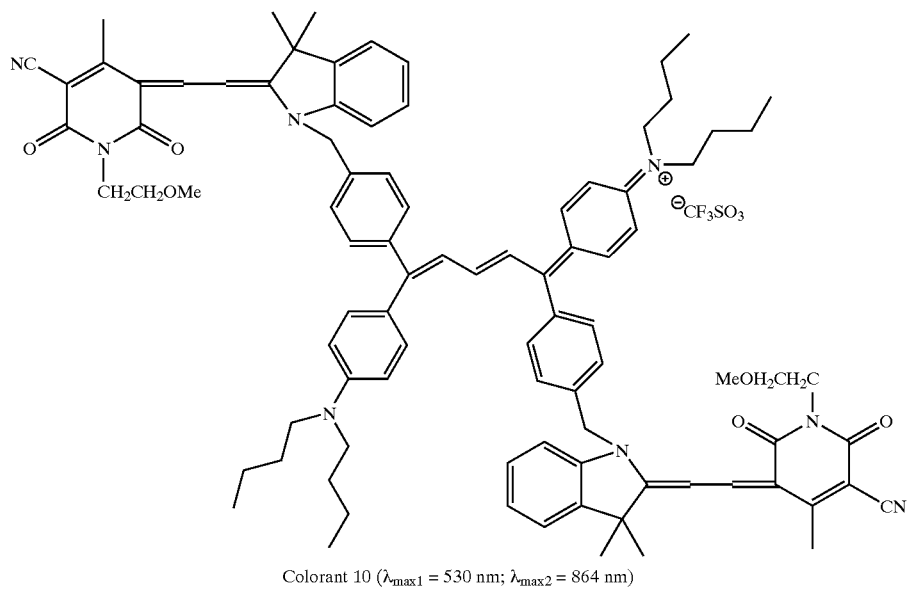
Colorant 10 (λ$_{max1}$ = 530 nm; λ$_{max2}$ = 864 nm)
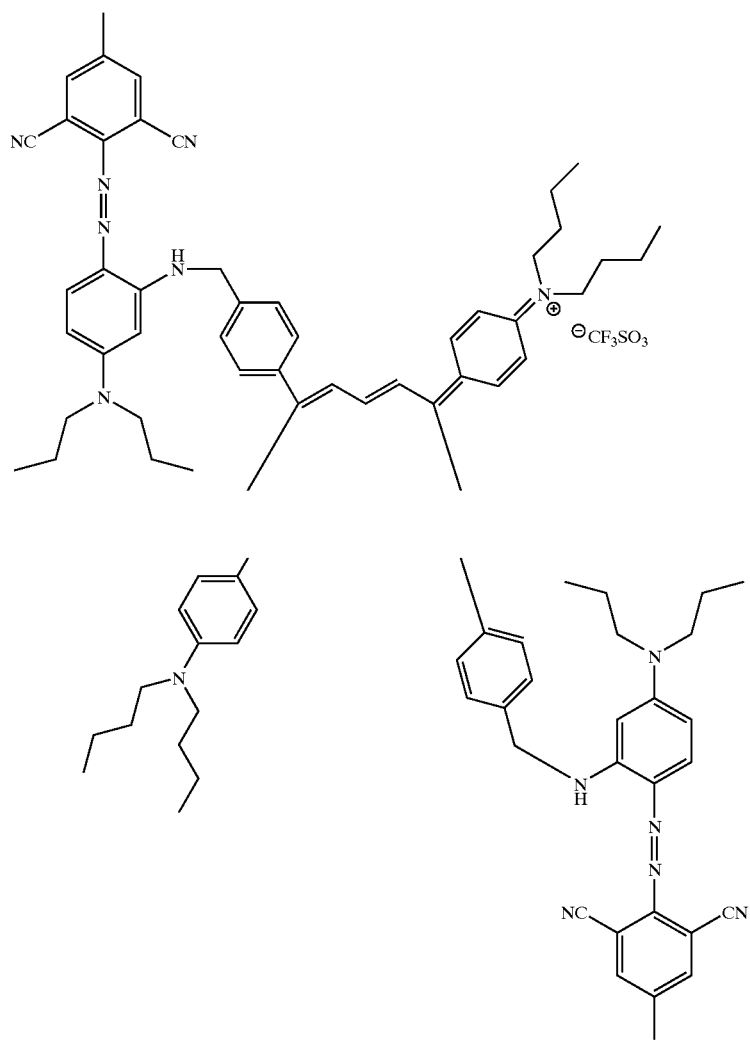
Colorant 11 (λ$_{max1}$ = 532 nm; λ$_{max2}$ = 861 nm)

-continued
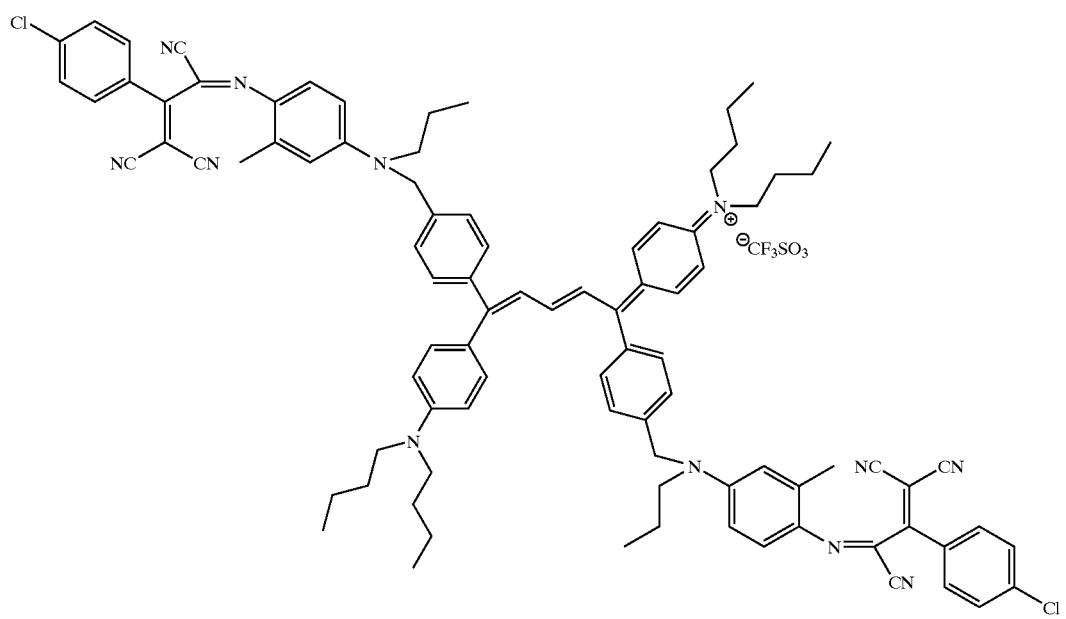
Colorant 12 ($\lambda_{max1}$ = 610 nm; $\lambda_{max2}$ = 862 nm)
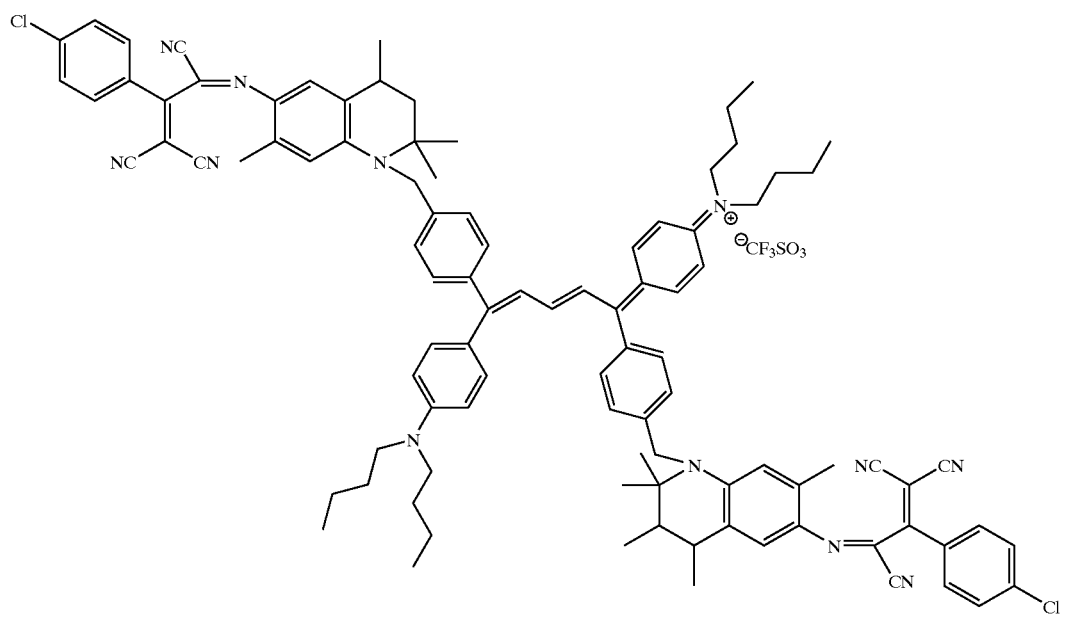
Colorant 13 ($\lambda_{max1}$ = 630 nm; $\lambda_{max2}$ = 861 nm)

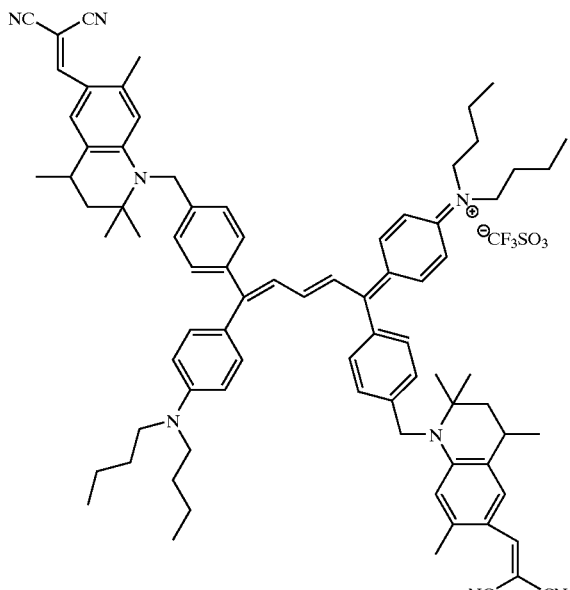
Colorant 14 (λ_max1 = 450 nm; λ_max2 = 863 nm)
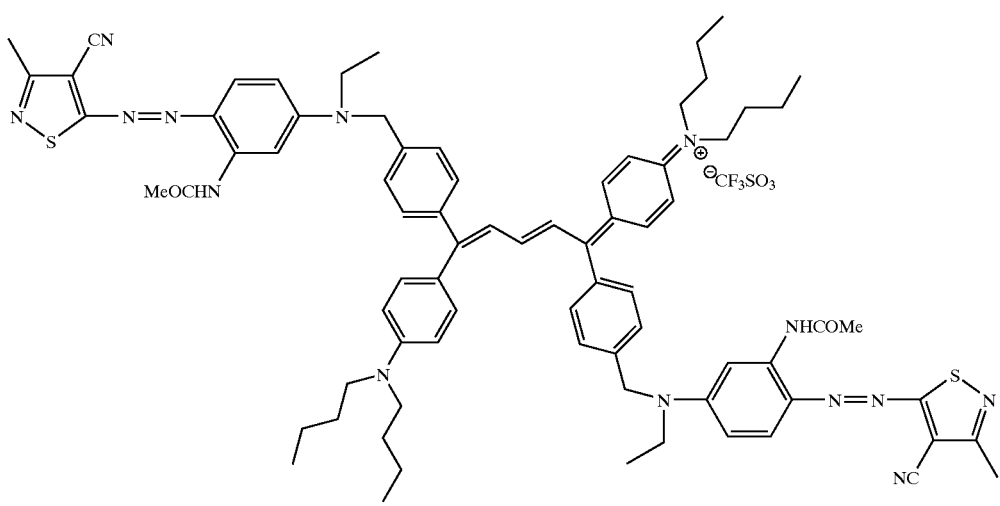
Colorant 15 (λ_max1 = 550 nm; λ_max2 = 867 nm)

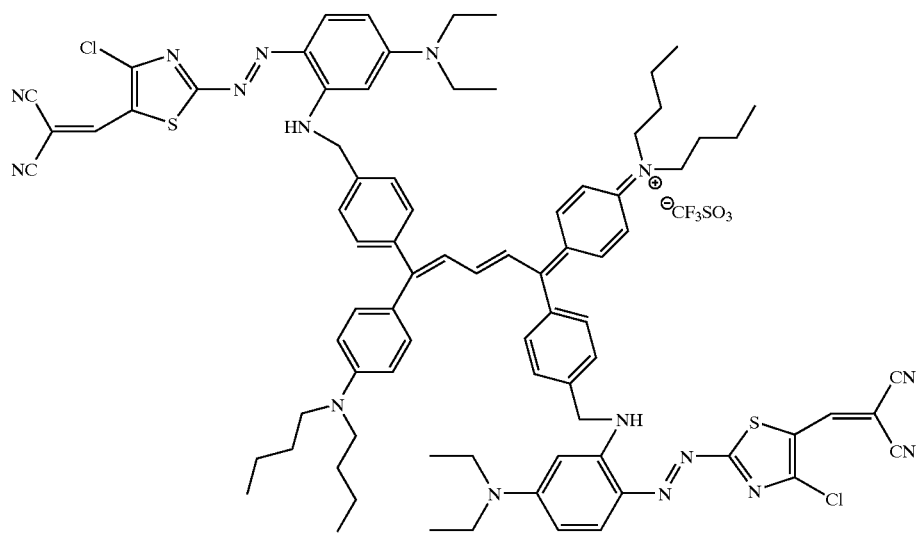
Colorant 16 ($\lambda_{max1}$ = 610 nm; $\lambda_{max2}$ = 864 nm)
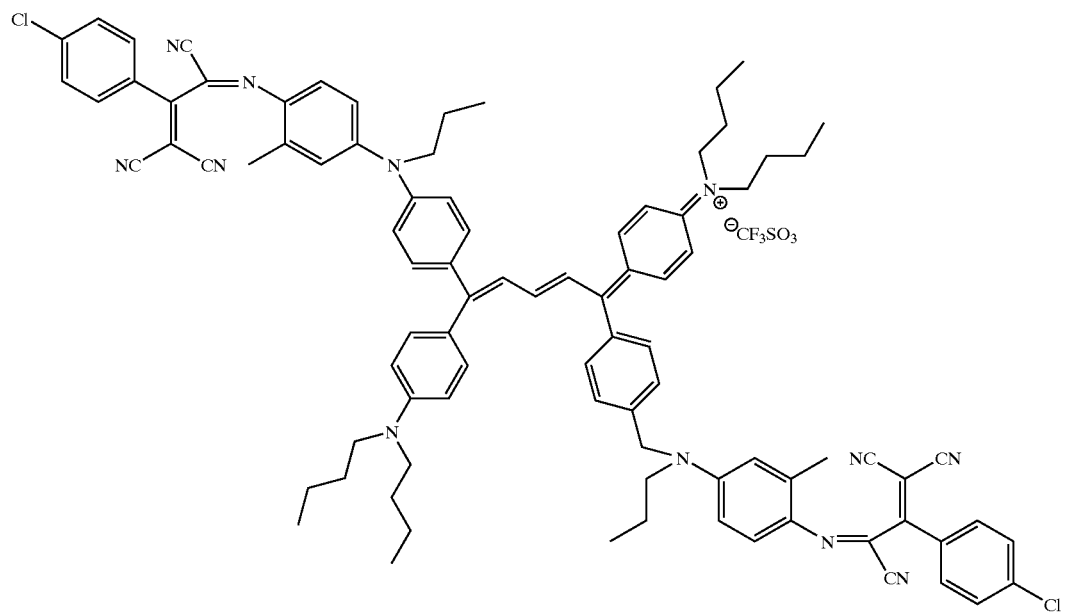
Colorant 17

-continued
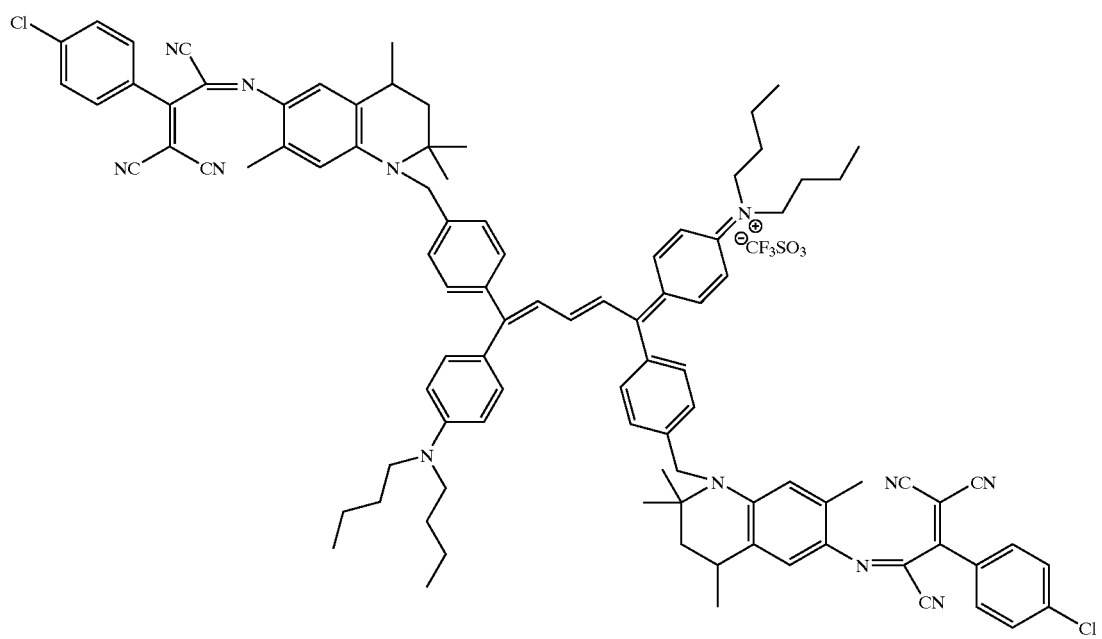
Colorant 18
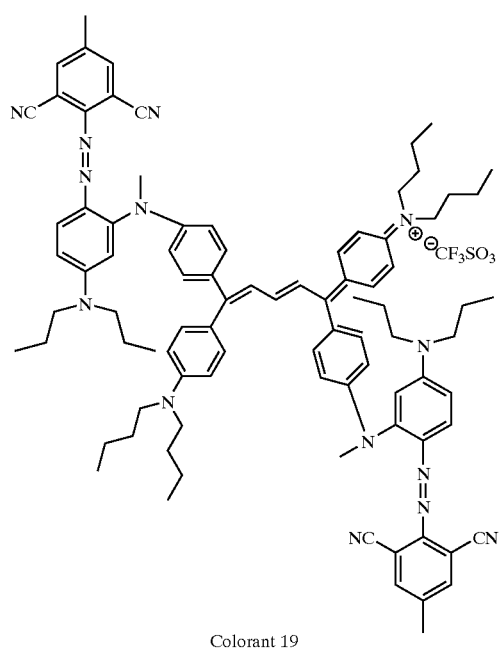
Colorant 19

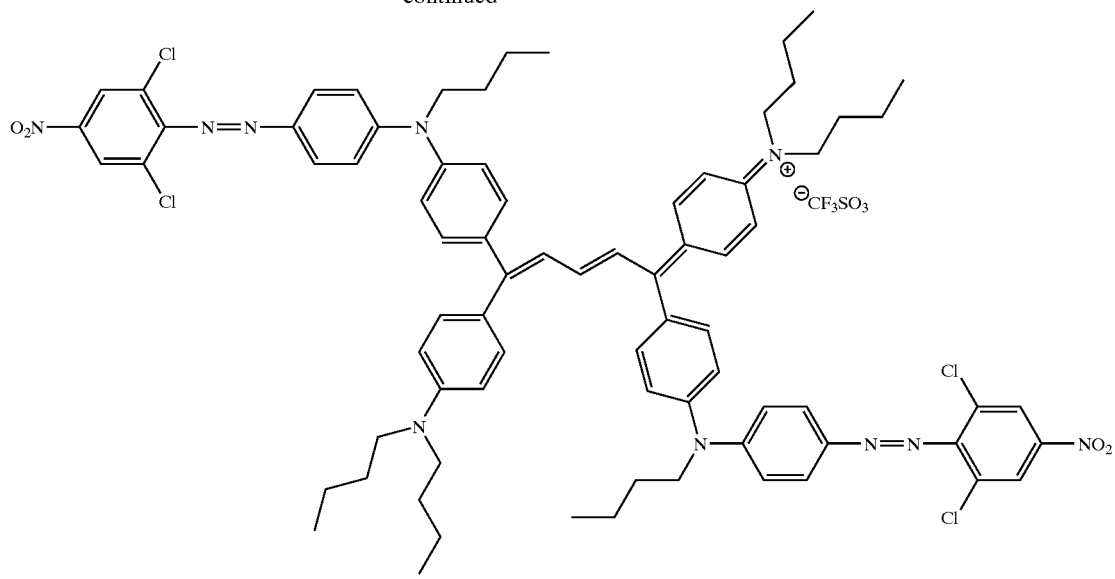
Colorant 20
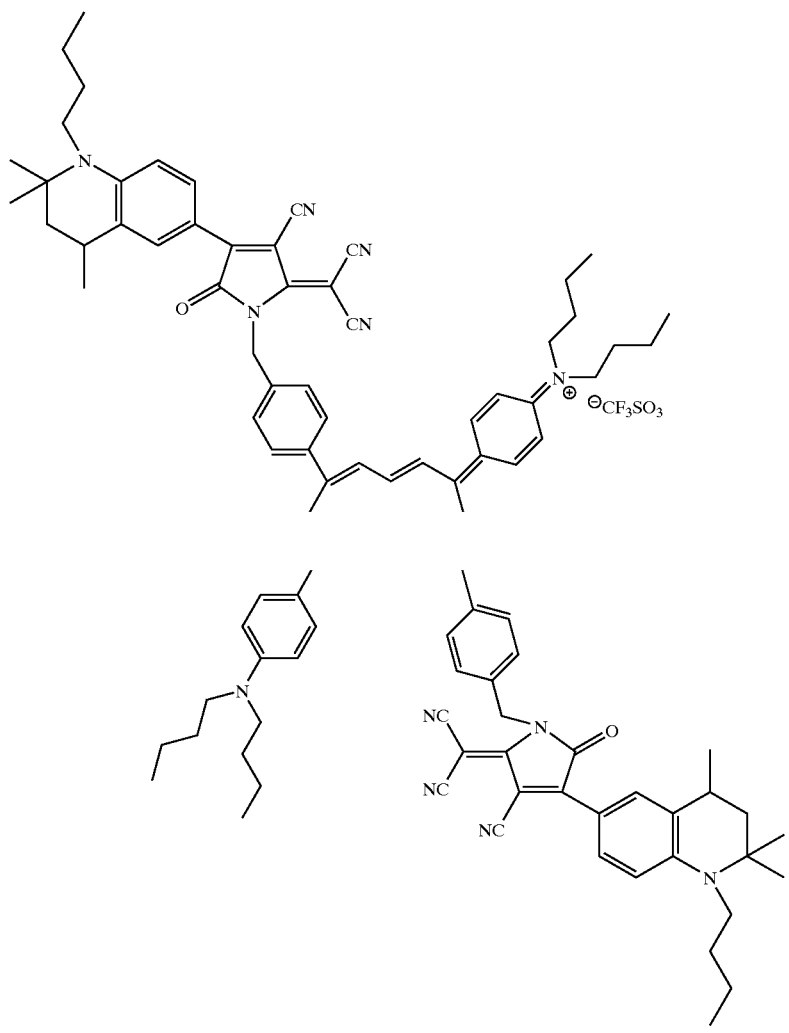
Colorant 21 ($\lambda_{max1}$ = 650 nm; $\lambda_{max2}$ = 853 nm)

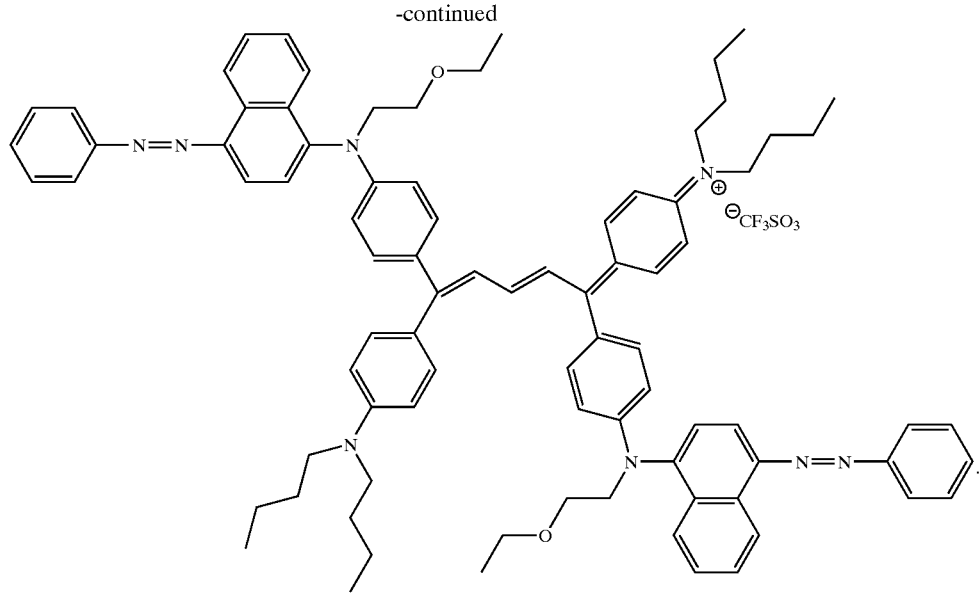

Colorant 22 ($\lambda_{max1}$ = 420 nm, $\lambda_{max2}$ = 864 nm)

20. The molecule of claim 2 comprising hydrophobic groups, solubilizing groups, blocking groups, and releasing or releasable groups.

21. The molecule of claim 2 wherein the first and second chromophores are not linked by a conjugated chain.

22. A dispersion containing the molecule of claim 2.

23. A suspension containing the molecule of claim 2.

24. The molecule of claim 5 comprising hydrophobic groups, solubilizing groups, blocking groups, and releasing or releasable groups.

25. The molecule of claim 5 wherein the first and second chromophores are not linked by a conjugated chain.

26. A dispersion containing the molecule of claim 5.

27. A suspension containing the molecule of claim 5.

28. A dispersion containing the molecule of claim 7.

29. A suspension containing the molecule of claim 7.

30. A dispersion containing the molecule of claim 12.

31. A suspension containing the molecule of claim 12.

* * * * *

UNITED STATES PATENT AND TRADEMARK OFFICE
CERTIFICATE OF CORRECTION

PATENT NO. : 6,831,163 B2
DATED : December 14, 2004
INVENTOR(S) : Ruizheng Wang et al.

It is certified that error appears in the above-identified patent and that said Letters Patent is hereby corrected as shown below:

<u>Column 37,</u>
Line 6, delete "chromonhores" and replace with -- chromophores --.
Lines 26 and 29, delete "chromopores" and replace with -- chromophores --.

Signed and Sealed this

Twenty-seventh Day of September, 2005

JON W. DUDAS
*Director of the United States Patent and Trademark Office*